(12) United States Patent
Birglen

(10) Patent No.: US 8,720,964 B2
(45) Date of Patent: May 13, 2014

(54) SELF-ADAPTIVE MECHANICAL FINGER AND METHOD

(75) Inventor: Lionel Birglen, Brossard (CA)

(73) Assignee: Polyvalor, Limited Partnership, Montreal (CA)

( * ) Notice: Subject to any disclaimer, the term of this patent is extended or adjusted under 35 U.S.C. 154(b) by 829 days.

(21) Appl. No.: 12/690,256

(22) Filed: Jan. 20, 2010

(65) Prior Publication Data

US 2010/0181792 A1    Jul. 22, 2010

Related U.S. Application Data

(60) Provisional application No. 61/145,817, filed on Jan. 20, 2009, provisional application No. 61/165,982, filed on Apr. 2, 2009.

(51) Int. Cl.
    *B66C 1/00* (2006.01)

(52) U.S. Cl.
    USPC ............................................ 294/106; 901/39

(58) Field of Classification Search
    USPC ......... 294/106, 198, 213; 901/38, 39; 623/63, 623/64
    See application file for complete search history.

(56) References Cited

U.S. PATENT DOCUMENTS

| | | | |
|---|---|---|---|
| 3,927,424 A | 12/1975 | Itoh | |
| 4,351,553 A | 9/1982 | Rovetta et al. | |
| 4,377,305 A * | 3/1983 | Horvath | 294/106 |
| 4,834,443 A | 5/1989 | Crowder et al. | |
| 4,957,320 A | 9/1990 | Ulrich | |
| 5,108,140 A | 4/1992 | Bartholet | |
| 5,280,981 A * | 1/1994 | Schulz | 294/106 |
| 5,378,033 A | 1/1995 | Guo et al. | |
| 5,570,920 A | 11/1996 | Crisman et al. | |
| 5,588,688 A * | 12/1996 | Jacobsen et al. | 294/106 |
| 5,762,390 A | 6/1998 | Gosselin et al. | |
| 6,443,944 B1 | 9/2002 | Doshi et al. | |
| 2005/0234564 A1* | 10/2005 | Fink et al. | 623/62 |
| 2008/0269907 A1* | 10/2008 | Puchhammer | 623/21.11 |
| 2011/0115244 A1* | 5/2011 | Kamon et al. | 294/106 |
| 2011/0148132 A1* | 6/2011 | Park et al. | 294/106 |
| 2011/0241369 A1* | 10/2011 | Kamon et al. | 294/213 |

OTHER PUBLICATIONS

Salisbury, J.K., and Craig, J.J., in "*Articulated Hands: Force Control and Kinematic Issues*," Int. J. Robot Res., 1(1), 1982, pp. 4-17.

(Continued)

*Primary Examiner* — Saul Rodriguez
*Assistant Examiner* — Gabriela Puig
(74) *Attorney, Agent, or Firm* — Norton Rose Fulbright Canada LLP

(57) ABSTRACT

A mechanical finger comprises at least three phalanges, with a base phalanx pivotally connected at a proximal end to a base. At least one intermediate phalanx is pivotally connected at a proximal end to a distal end of the base phalanx. An end phalanx is pivotally connected at a proximal end to a distal end of a distal-most one of the at least one intermediate phalanx. The phalanges pivot about parallel pivot axes. A transmission linkage is between the base and the end phalanx. The transmission linkage has links and joints unconnected to any of the phalanges other than the end phalanx, the transmission linkage being configured so as not to constrain the degrees of freedom of the mechanical finger.

4 Claims, 20 Drawing Sheets

(56) References Cited

OTHER PUBLICATIONS

Jacobsen, S.C., Iversen, E.K., Knutti, D.F., Johnson, R.T., and Biggers, K.B., in "*Design of the Utah/MIT Dextrous Hand*," proceedings of the IEEE International Conference on Robotics and Automation, San Francisco, California, Apr. 7-11, 1986, pp. 1520-1532.

Liu, H., Meusel, P., Seitz, N., Willberg, B., Hirzinger, G., and Jin, M.H., in "*The Modular Multisensory DLR-HIT-Hand*," Mech. Mach. Theory, 42(5), 2007, pp. 612-625.

Shimojima, H., Yamamoto, K., and Kawakita, K., "*A Study of Grippers with Multiple Degrees of Mobility*," JSME Int. J., 30(261), 1987, pp. 515-522.

Laliberté, T., and Gosselin, C., "*Simulation and Design of Underactuated Mechanical Hands*," Mech. Mach. Theory, 33(1), 1998, pp. 39-57.

Hirose, S., "*Connected Differential Mechanism and its Applications*," proceedings of the International Conference on Advanced Robotics, Tokyo, Japan, Sep. 9-10, 1985, pp. 319-325.

Birglen, L., Laliberté, T., and Gosselin, C., "*Underactuated Robotic Hands*," Springer-Verlag, New York, 2008.

Birglen, Lionel, "*Type Synthesis of Linkage-Driven Self-Adaptive Fingers*," Department of Mechanical Engineering, École Polytechnique de Montréal, Montréal, Canada, Oct. 23, 2008.

\* cited by examiner

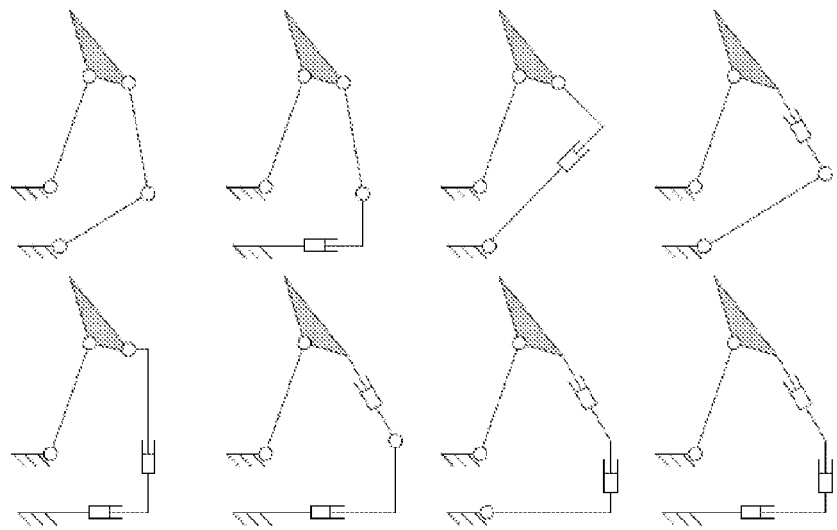

Fig. 8

| Label | Authors |
|---|---|
| C234 | Itoh, H., U.S. Patent No. 3,927,424 |
| S, B567, A671, B456, B345, C234 | Shimojima et al., "A Study of Grippers with Multiple Degrees of Mobility," JSME Int. J., 30(261), 1987, pp. 515-522 |
| S, A671, B456, C234, A4567, B4567 | Laliberté et al., "Simulation and Design of Underactuated Mechanical Hands," Mech. Mach. Theory, 33(1), 1998, pp. 39-57 |
|  | Gosselin et al., U.S. Patent No. 5,762,390 |
| C234 | Dubey et al., "A Finger Mechanism for Adaptive End Effectors," proceedings of the ASME Design and Engineering Technical Conferences, Montréal, Canada, Sept. 29-Oct. 2, 2002, Paper No. DETC2002/MECH-34317 (self-adaptive part of the finger). |

Fig. 10

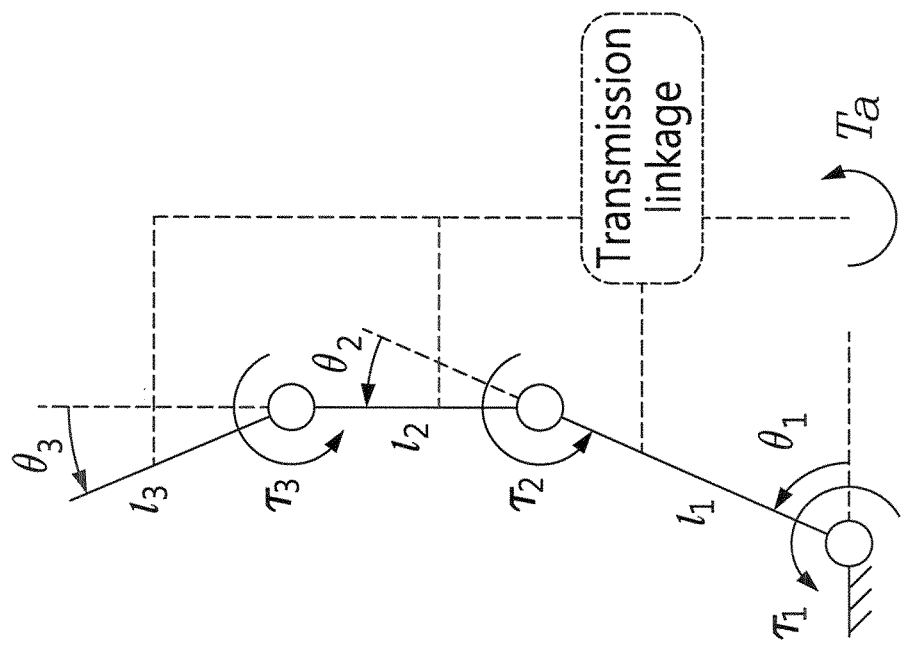
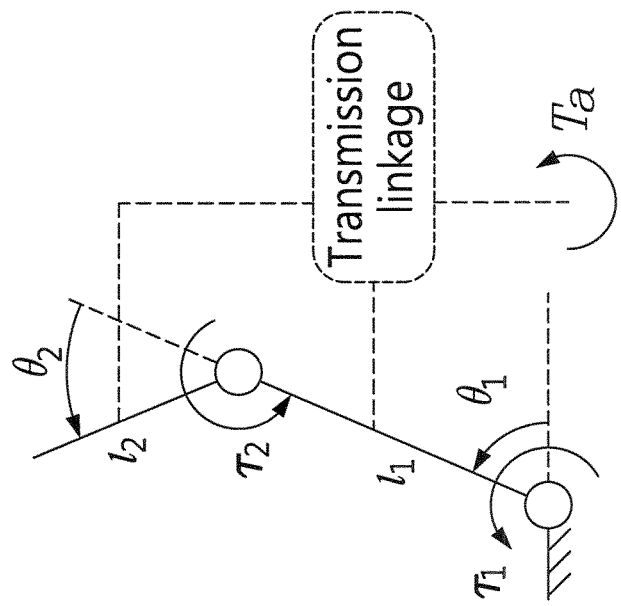
Fig. 11

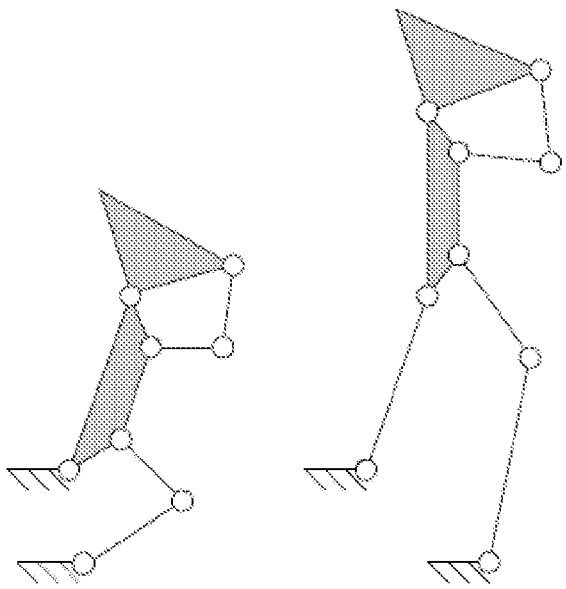
Fig. 13
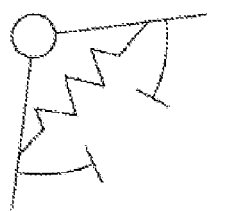
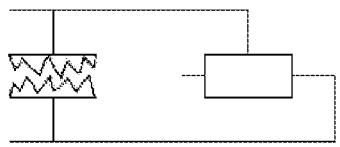
Spring          Friction
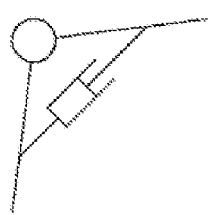
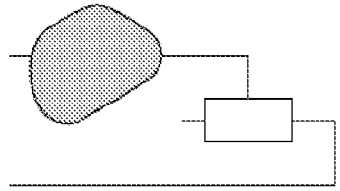
Damper          Mass/Inertia
*Triggered*
*Continuous*
Fig. 14

| | |
|---|---|
| $S$ | $\begin{bmatrix} 1.1 & -0.7 & 0.5 \\ 0.4 & -0.6 & 1.2 \end{bmatrix}$ |
| $A234$ | $\begin{bmatrix} 0.7 & 1.3 & 1.6 & 3.0 & -3.2 & 1.7 \\ 0 & 0 & 0 & 0.9 & -2.4 & 2.5 \end{bmatrix}$ |
| $A456$ | $\begin{bmatrix} 1.0 & 0.6 & 0.6 & -0.3 & 0.9 & -1.1 \\ 0.5 & 0.9 & 1.5 & -0.5 & 1.3 & -1.7 \end{bmatrix}$ |
| $A567$ | $\begin{bmatrix} 1.0 & -0.5 & -0.5 & 0.3 & -0.7 & 0.9 \\ 0.5 & -0.8 & -1.3 & 0.9 & -1.8 & 2.2 \end{bmatrix}$ |
| $A671$ | $\begin{bmatrix} 1.4 & 2.0 & 1.6 & 0 & 0 & 0 \\ 0.6 & 1.5 & 2.2 & 1.2 & 1.4 & 1.2 \end{bmatrix}$ |
| $A673$ | $\begin{bmatrix} 2.4 & -3.0 & 1.3 & -0.3 & -1.0 & 1.0 \\ 2.0 & -3.9 & 2.9 & 1.0 & 2.7 & -2.8 \end{bmatrix}$ |
| $B123$ | $\begin{bmatrix} -1.0 & -1.3 & -1.3 & -0.6 & -0.4 & 0.2 \\ 0 & 0 & 0 & 0.7 & 2.9 & 3.2 \end{bmatrix}$ |
| $B345$ | $\begin{bmatrix} 0.7 & 2 & -6.6 & 4.5 & -3.5 & -7.7 \\ 0.0 & 4.0 & -11.1 & 8.1 & -5.9 & -13.0 \end{bmatrix}$ |
| $B456$ | $\begin{bmatrix} 1.0 & 0.1 & 0.9 & 0.8 & 1.1 & 1.0 \\ 0.2 & 1.1 & 2.3 & 2.0 & 2.8 & 2.5 \end{bmatrix}$ |
| $B567$ | $\begin{bmatrix} 1.5 & 1.4 & -0.9 & 0 & 0 & 0 \\ 0.5 & 0.5 & 0.1 & 1.1 & 1.5 & 1.3 \end{bmatrix}$ |
| $C123$ | $\begin{bmatrix} 1.5 & 1.9 & 1.3 & 0.2 & 1.6 & 1.2 \\ 0.8 & 1.7 & 0.6 & 1.2 & 1.7 & 2.0 \end{bmatrix}$ |
| $C234$ | $\begin{bmatrix} 1.2 & 2.3 & 3.3 & -1.2 & 3.5 & 1.4 \\ 0.6 & 1.7 & 1.7 & 0.5 & 3.4 & 2.2 \end{bmatrix}$ |
| $C237$ | $\begin{bmatrix} 0.8 & 0.4 & -9.9 & 0.9 & 1.1 & -0.8 \\ 0.2 & 0.7 & -1.4 & 1.8 & 0.5 & 0.9 \end{bmatrix}$ |
| $C734$ | $\begin{bmatrix} 1.0 & 0.4 & 0.4 & 1.2 & 0 & 1.3 \\ 0.4 & 0.6 & 1.2 & 1.0 & 0.8 & 0.3 \end{bmatrix}$ |

*Fig. 15*

| S | A456 | A567 | A671 | A673 | B456 |
|---|---|---|---|---|---|
| 2.7 | 2 | 2 | 2.3 | 1.2 | 5 |
| B567 | C123 | C234 | C237 | C734 | |
| 3 | 1.9 | 2 | 4 | 2.5 | |

| $l_1$ | $l_2$ | $l_3$ | $\psi$ | $a$ | $b$ | $c$ | $d$ |
|---|---|---|---|---|---|---|---|
| 1 | 0.7 | 0.5 | $\pi/2$ | 2 | 2.5 | 0.2 | 1 |
| $e$ | $f$ | $g$ | $h$ | $i$ | $\phi$ | $\chi$ | |
| 1 | 1 | 1 | 0.2 | 0 | 0 | 0 | |

*Fig. 19*

| Actuation ($T_a =$) | $\tau_4$ | $\tau_5$ | $\tau_6$ | $\tau_6$ | $\tau_8$ | $\tau_9$ |
|---|---|---|---|---|---|---|
| $\eta\ (10^{-5})$ | 7.4 | 0.012 | 0 | 0.003 | 0.013 | 0.004 |

*Fig. 20*

|  | $m$ | $n$ | $o$ | $p$ | $\phi$ | $\zeta$ | $\eta$ |
|---|---|---|---|---|---|---|---|
| Case 1 | $r$ | $b$ | $c$ | $l_1$ | $\alpha + \beta$ | $\theta_1$ | $\theta_2 - \psi$ |
| Case 2 | $d$ | $s$ | $c$ | $l_1$ | $\alpha$ | $\theta_1$ | $\theta_2 - \psi$ |
| Case 3 | $d$ | $a$ | $t$ | $l_1$ | $\alpha$ | $\theta_1$ | $\theta_2 - \psi - \gamma$ |

*Fig. 28*

SELF-ADAPTIVE MECHANICAL FINGER AND METHOD

CROSS-REFERENCE TO RELATED APPLICATIONS

The present application claims priority on U.S. Provisional Patent Applications No. 61/145,817, filed on Jan. 20, 2009, and No. 61/165,982, filed on Apr. 2, 2009, both incorporated herein by reference.

FIELD OF THE APPLICATION

The present application relates to a method of synthesizing mechanical architectures of self-adaptive robotic fingers driven by linkages.

BACKGROUND OF THE ART

Self-adaptive mechanisms are used in robotic fingers to provide the latter with the ability to adjust themselves to the shape of the object seized without any dedicated electronics, sensor or control. Because of the lack of commercial and industrial success of complex robotic hands, self-adaptive mechanisms have attracted much more interest from the research community and several prototypes have been built. Nevertheless, only a handful of prototypes are currently known.

Robotic hands are arguably the most popular end-effectors of robotic systems, at least within the research community. These devices have been developed with the aim of matching the human hands in terms of dexterity and adaptation capabilities, a difficult challenge with the currently available technologies. Robotic hands are often designed to equip either a dextrous manipulator for pick-and-place tasks or a human being as a prosthetic device. Several pioneer prototypes have been developed, some of them for more than two decades, and include the Stanford/JPL hand, as described by Salisbury, J. K., and Craig, J. J., in "*Articulated Hands: Force Control and Kinematic Issues,*" Int. J. Robot Res., 1(1), 1982, pp. 4-17, the Utah/MIT hand, as described by Jacobsen, S. C., Iversen, E. K., Knutti, D. F., Johnson, R. T., and Biggers, K. B., in "*Design of the Utah/MIT Dextrous Hand,*" proceedings of the IEEE International Conference on Robotics and Automation, San Francisco, Calif., Apr. 7-11, 1986, pp. 1520-1532, and the hands from the DLR, as described by Liu, H., Meusel, P., Seitz, N., Willberg, B., Hirzinger, G., and Jin, M. H., in "*The Modular Multisensory DLR-HIT-Hand,*" Mech. Mach. Theory, 42(5), 2007, pp. 612-625. However, these prototypes have all been designed aiming at an anthropomorphic architecture where each joint is independently actuated and the complexity of controlling often more than 12 axes, simultaneously and in real time, is especially demanding and yields significant costs. Hence, despite their capabilities, robotic hands have often little, if any, success outside research laboratories.

In the past few years, a significant increase in the development of innovative technologies for robotic hands has tried to address this issue. Significant efforts have been made to find designs simple enough to be easily built and controlled, and special emphasis has been placed on the reduction of the number of degrees of freedom (DOF), thereby decreasing the number of required actuators. A rapidly growing number of prototypes involve a smaller number of actuators without decreasing the number of DOF by taking advantage of self-adaptive mechanisms. These prototypes may be driven by tendons or linkages. This approach leads to the automatic and mechanical adaptation of the robotic finger to the shape of the object seized.

A well known example of a self-adaptive two-DOF finger driven by linkages and its closing sequence is illustrated in FIG. 5, and is similar to the configuration shown in U.S. Pat. No. 5,762,390, by Gosselin et al. The finger is actuated through the lower link (cf. arrow) and a spring with a mechanical limit is used to maintain the finger fully extended. The closing sequence occurs with a continuous motion of the actuator. Finally, both phalanges are in contact with the object and the finger has completed the shape adaptation. The actuator force is distributed between the two phalanges in contact with the object.

The properties required to achieve the self-adaptive behavior are usually not detailed in the literature, as they remain unclear. Only a few papers have been published dealing with theoretical aspects—i.e., valid not only for a single architecture but for a wide range of solutions—of self-adaptive mechanisms applied to grasping, namely, Shimojima, H., Yamamoto, K., and Kawakita, K., "*A Study of Grippers with Multiple Degrees of Mobility,*" JSME Int. J., 30(261), 1987, pp. 515-522, Laliberté, T., and Gosselin, C., "*Simulation and Design of Underactuated Mechanical Hands,*" Mech. Mach. Theory, 33(1), 1998, pp. 39-57, Hirose, S., "*Connected Differential Mechanism and its Applications,*" proceedings of the International Conference on Advanced Robotics, Tokyo, Japan, Sep. 9-10, 1985, pp. 319-325, and Birglen, L., Laliberté, T., and Gosselin, C., "*Underactuated Robotic Hands,*" Springer-Verlag, New York, 2008. Additionally, if the analysis of self-adaptive fingers is well detailed in the literature, as in Birglen et al., to the best of the author's knowledge, only the Shimojima et al. reference discusses the synthesis of such mechanisms. In the latter reference, only two-phalanx self-adaptive fingers are synthesized and six architectures are obtained.

SUMMARY OF THE APPLICATION

It is an aim of the present application to provide novel self-adaptive mechanical fingers.

It is a further aim of the present application to provide a methodology that is able to generate thousands of self-adaptive robotic fingers driven by linkages with two and three phalanges. First, potential kinematic architectures are synthesized using a well known technique. Second, the issue of proper actuation and passive element(s) selection and location is addressed.

It is the primary aim of the present application to present how to synthesize mechanisms that can be used to design highly efficient robotic hands which can adapt themselves to the shape of the object seized.

Therefore, in accordance with the present application, there is provided a mechanical finger comprising: at least three phalanges, with a first phalanx pivotally connected at a proximal end to a base; a second phalanx pivotally connected at a proximal end to a distal end of the first phalanx; a third phalanx pivotally connected at a proximal end to a distal end of the second phalanx, said at least three phalanges pivoting about parallel pivot axes; and a transmission linkage between the base and the third phalanx, the transmission linkage having links and joints unconnected to any of the phalanges other than the third phalanx, the transmission linkage being configured so as not to constrain the degrees of freedom of the mechanical finger.

Further in accordance with the present application, there is provided a mechanical finger of the type having three phalanges connected to a base and supported by a transmission linkage, the mechanical finger comprising: a first and a second ternary link, the first and the second ternary link being pivotally connected to one another; a first link sequence having at least three binary links actively interconnected to one another, with ends of the first link sequence being pivotally connected to the first and the second ternary link; and a second link sequence having at least three binary links actively interconnected to one another, with ends of the second link sequence being pivotally connected to the first and the second ternary link; the ternary links and the link sequences being arranged such that one of the binary links forms an end phalanx, and such that one of the ternary links forms the intermediate phalanx.

Still further in accordance with the present application, there is provided a mechanical finger of the type having three phalanges connected to a base and supported by a transmission linkage, the mechanical finger comprising: a first and a second ternary link; an isolated link having ends pivotally connected to the first and the second ternary link; a first link sequence having at least three binary links actively interconnected to one another, with ends of the first link sequence being pivotally connected to the first and the second ternary link; and a second link sequence having at least two binary links actively interconnected to one another, with ends of the second link sequence being pivotally connected to the first and the second ternary link; the ternary links, the isolated link and the link sequences being arranged such that a sequence of a base phalanx, an intermediate phalanx and an end phalanx comprises at least one of the binary links and at least one of the ternary links.

Still in accordance with the present application, there is provided a method for forming a mechanical finger comprising: connecting a proximal end of a first phalanx to a base with a pivot joint; connecting a proximal end of a second phalanx to a distal end of the first phalanx with another pivot joint; connecting at least a third phalanx to the series of phalanges by connecting a proximal end of a third phalanx to a distal end of the second phalanx with yet another pivot joint, with axes of all pivot joints being parallel to one another; and connecting a transmission linkage between the base and a distal-most one of the phalanges without contacting any other of the phalanges and without constraining the degrees of freedom of the series of phalanges.

Still further in accordance with the present application, there is provided a mechanical finger comprising: at least three phalanges, with a first phalanx pivotally connected at a proximal end to a base; a second phalanx pivotally connected at a proximal end to a distal end of the first phalanx; a third phalanx pivotally connected at a proximal end to a distal end of the second phalanx, said at least three phalanges pivoting about parallel pivot axes; and a transmission linkage between the base and the last phalanx of a finger with at least three phalanges, the transmission linkage having links and joints unconnected to any of the phalanges other than this last phalanx, the transmission linkage being configured so as not to constrain the mobilities of the mechanical finger.

Still further in accordance with the present application, there is provided a mechanical finger comprising: three phalanges, with a first phalanx pivotally connected at a proximal end to a base; a second phalanx pivotally connected at a proximal end to a distal end of the first phalanx; a third phalanx pivotally connected at a proximal end to a distal end of the second phalanx, said at least three phalanges pivoting about parallel pivot axes; and a transmission linkage between the base and the third phalanx, the transmission linkage being composed of two branches each of the latter having links and joints unconnected to any of the phalanges other than the third phalanx, the transmission linkage being configured so as not to constrain the degrees of freedom of the mechanical finger.

Still further in accordance with the present application, there is provided a mechanical finger comprising: three phalanges, with a first phalanx pivotally connected at a proximal end to a base; a second phalanx pivotally connected at a proximal end to a distal end of the first phalanx; a third phalanx pivotally connected at a proximal end to a distal end of the second phalanx, said at least three phalanges pivoting about parallel pivot axes; and a transmission linkage between the base and the third phalanx, this transmission linkage being composed of a link with three joints. One of this joint being attached to the second phalanx. The second of these joints being attached to a single link which is in turn attached to the ground. The third and last of these joints being connected to the third phalanx through two link connected together. This transmission linkage being configured so as not to constrain the degrees of freedom of the mechanical finger.

Still further in accordance with the present application, there is provided a mechanical finger comprising: three phalanges, with a first phalanx pivotally connected at a proximal end to a base; a second phalanx pivotally connected at a proximal end to a distal end of the first phalanx; a third phalanx pivotally connected at a proximal end to a distal end of the second phalanx, said at least three phalanges pivoting about parallel pivot axes; a transmission linkage between the base and the third phalanx, this transmission linkage being of any type; and a set of two triggered passive elements located in the finger or its transmission linkage in order to keep the third phalanx with a constant orientation with respect to the palm of the finger.

Still further in accordance with the present application, there is provided a mechanical finger comprising: three phalanges, with a first phalanx pivotally connected at a proximal end to a base; a second phalanx pivotally connected at a proximal end to a distal end of the first phalanx; a third phalanx pivotally connected at a proximal end to a distal end of the second phalanx, said at least three phalanges pivoting about parallel pivot axes; a transmission linkage between the base and the third phalanx, this transmission linkage being of any type; a set of two triggered passive elements located in the finger or its transmission linkage in order for the resulting motion of the finger to mimic the one of a human finger before contacting any object.

BRIEF DESCRIPTION OF THE DRAWINGS

FIG. 8 is a schematic view of two-phalanx fingers of a first class in accordance with the present disclosure;

FIG. 10 is a table showing a classification of some self-adaptive fingers known in the literature;

FIG. 11 is a schematic view of the distribution of torque in two and three-phalanx fingers.

FIG. 13 are schematic views of two- and three-phalanx finger architectures with a quaternary link;

FIG. 14 is a schematic view of single-joint passive elements;

FIG. 15 is non-trivial columns of Selection matrices;

FIG. 19 is a table of geometric parameters;

FIG. 20 is a table of index η for different locations of the actuation;

FIG. 28 is a table of associations between geometric parameters;

DESCRIPTION OF THE PREFERRED EMBODIMENTS

The self-adaptive behavior of mechanical fingers is obtained by combining two elements, namely a transmission linkage and passive elements. The main challenge faced when conceiving self-adaptive fingers is how to design the transmission linkage and what linkages do actually achieve this property. Numerous linkages can be used to design an acceptable transmission mechanism provided they satisfy a few hypotheses, namely:

1. the transmission linkage should reach the distal phalanx;
2. the transmission linkage should be connected to the ground;
3. the transmission linkage must not restrict the DOF of the finger.

The first two hypotheses are optional when designing robotic fingers which include only self-adaptation parts in their designs, but restrict the analysis to these self-adaptive parts of the finger. Based on these two hypotheses, the system constituted by the finger and the transmission linkage is a closed-loop mechanism. Finally, the last hypothesis ensures that the mobility of the finger is not constrained by the transmission linkage, which would result in a coupled motion finger, losing the self-adaptation property. Based on these hypotheses, a number synthesis, a method found in textbooks on the design of machinery, can be used to generate possible mechanisms.

Figure 1:
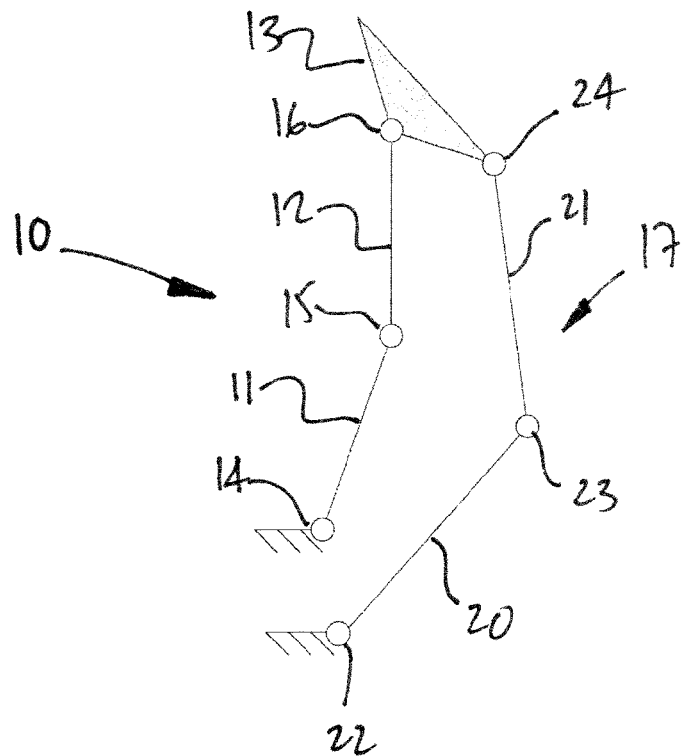
FIG. 1 is a schematic view of a self-adaptive mechanical finger in accordance with a first class (S) of mechanical fingers in accordance with the present disclosure.

Referring to FIG. 1, a mechanical finger in accordance with an embodiment of the present disclosure is generally shown at 10. The mechanical finger 10 has a sequence of phalanges, namely a first phalanx 11 (i.e., the proximal phalanx), a second phalanx 12 (i.e., the intermediate phalanx), and a third phalanx 13 (i.e., the distal phalanx).

The first phalanx 11 is connected to a base by revolute joint 14. The first phalanx 11 and the second phalanx 12 are interconnected by revolute joint 15. Finally, the second phalanx 12 and the third phalanx 13 are interconnected by a revolute joint 16. The pivot axes of the revolute joints 14, 15 and 16 are parallel to one another.

A transmission linkage 17 interconnects the third phalanx 13 to the base, thereby forming a closed loop linkage. The transmission linkage 17 has a first link 20 (i.e., the proximal link) and a second link 21 (i.e., the distal link). The first link 20 is connected to the base by revolute joint 22. The first link 20 and the second link 21 are interconnected by revolute joint 23. The second link 21 is connected to the third phalanx 13 by revolute joint 24. The pivot axes of the revolute joints 22, 23 and 24 are parallel to one another.

It is observed that all links of the mechanical finger 10 (including the phalanges and the links of the transmission linkage 17) are binary links. Accordingly, there is no interconnection between the links of the transmission linkage 17 and the phalanges, with the exception of the third phalanx 13.

The mechanical finger 10 illustrated in FIG. 1 has a configuration that respects the three hypotheses set forth above. Firstly, the transmission linkage 17 reaches the distal phalanx, or third phalanx 13. Secondly, the transmission linkage 17 is connected to the ground or base, via revolute joint 22. Finally, the transmission linkage 17 does not restrict the DOF of the mechanical finger 10.

Figure 2:
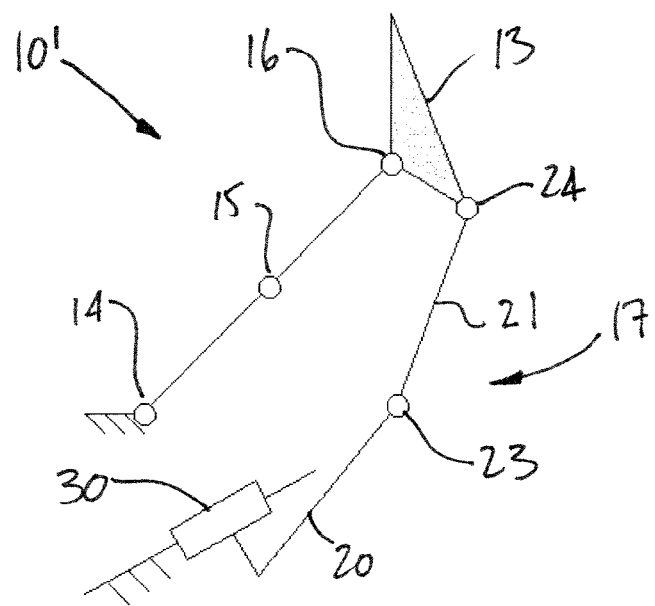
FIG. 2 is a schematic view of another self-adaptive finger of the first class.
Figure 3:
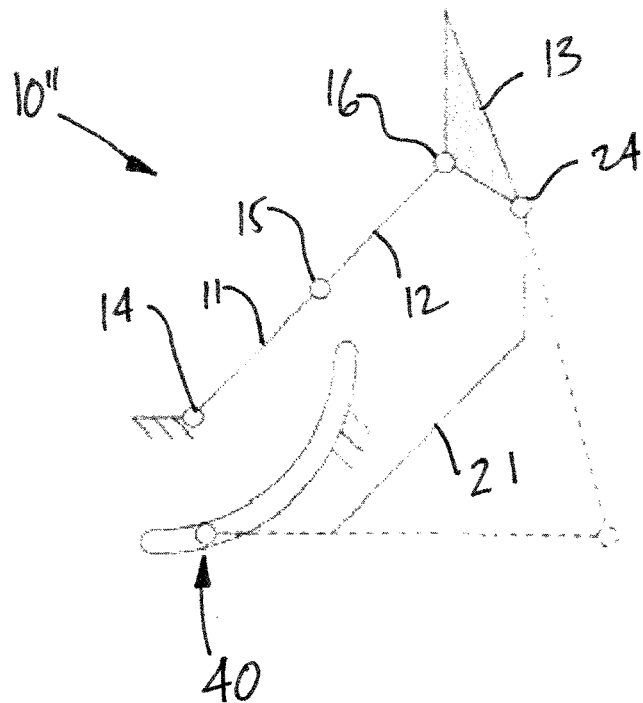
FIG. 3 is a schematic view of yet another self-adaptive mechanical finger of the first class, in an unbent state.
Figure 4:
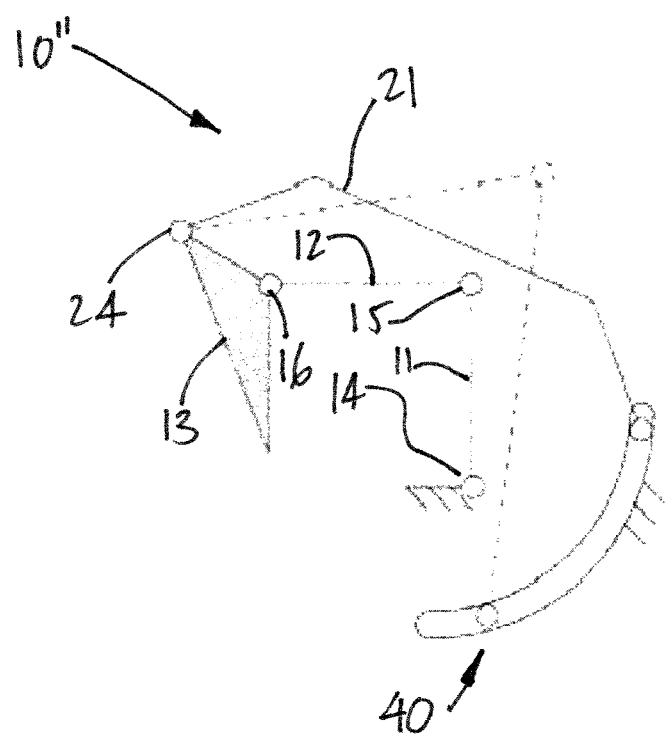
FIG. 4 is a schematic view of the self-adaptive mechanical finger of FIG. 3, in a bent state.

It is pointed out that additional links and/or phalanges may be integrated in the mechanical finger 10, as long as the three hypotheses are respected. Moreover, for the class of mechanical fingers illustrated in FIGS. 1 to 4, binary links/phalanges are used. In FIGS. 2 to 4, examples are given of mechanical fingers within the same class as the mechanical finger of FIG. 1, but with other types of one-DOF joints or linkages used (e.g., prismatic, slider, cam, etc).

Referring to FIG. 2, a mechanical finger is illustrated at 10'. Like elements between the mechanical fingers of FIGS. 1 and 2 bear like reference numerals. The difference between the mechanical fingers 10 and 10' is the use of a prismatic or translation joint 30 instead of revolute joint 22.

Referring to FIGS. 3 and 4, a mechanical finger is illustrated at 10". Like elements between the mechanical fingers of FIGS. 1 and 3-4 bear like reference numerals. The difference between the mechanical fingers 10 and 10" is the use of two degree-of-freedom joint 40 instead of the link 20 and revolute joints 22 and 24. In FIG. 3, the mechanical finger 10" is in an unbent state, whereas in FIG. 4, the mechanical finger 10" is bent.

Figure 31:
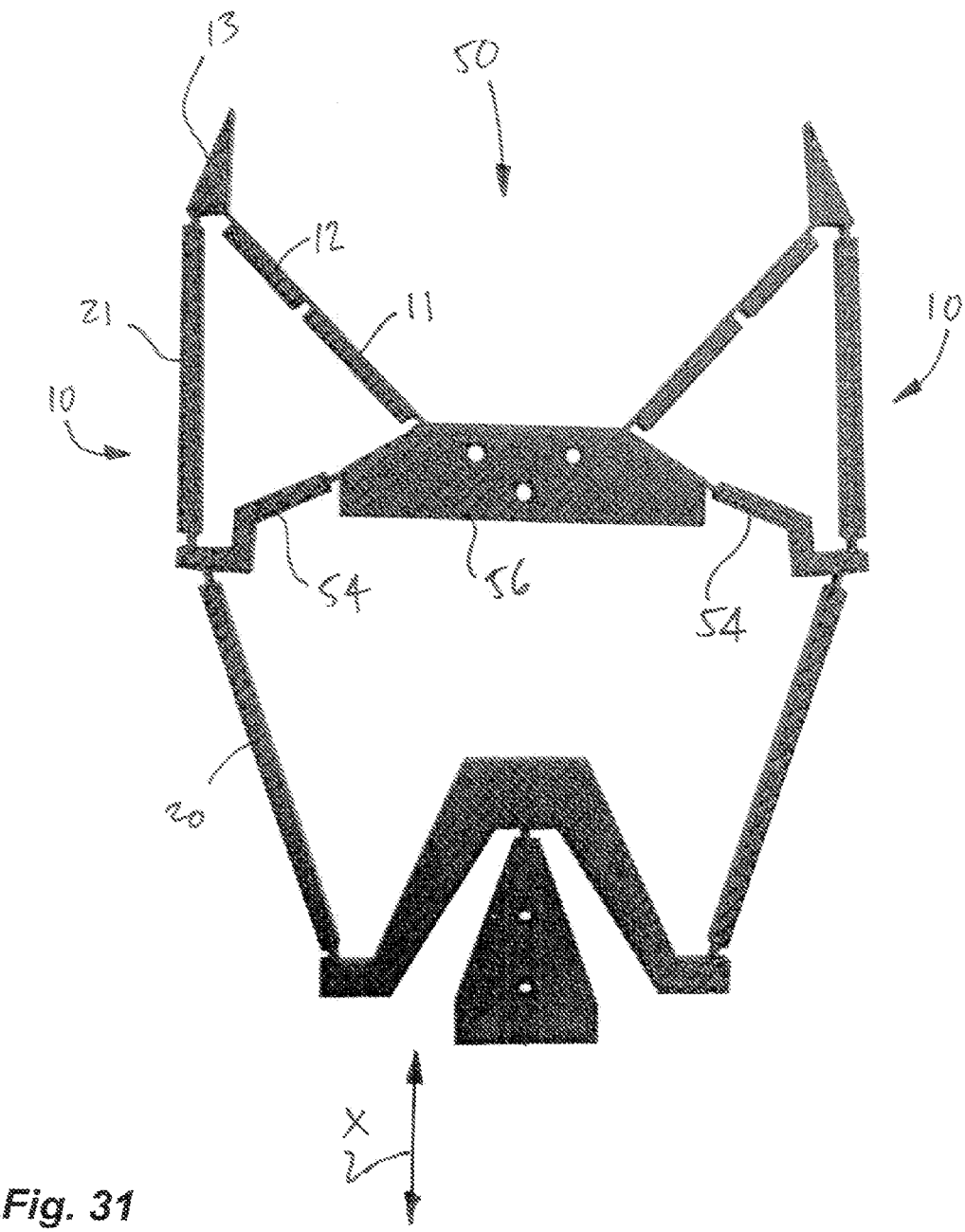
FIG. 31 is a plan view of pliers formed with a pair of the mechanical finger of the first class (S).

FIG. 31 shows a pair of the fingers 10 used in combination to define a set of pliers 50. This is an example among many others of an application of the mechanical fingers of the present application. The pliers 50 may be underactuated by a translational degree of actuation along direction X. Additional joints are added to relate the binary links 54 to the joints between the links 21 and 21 of each of the fingers 10, to pivotally relate the fingers 10 to the base member 56. These additional joints for the binary links 54 ensure a stable orientation of the pliers 10 when used to grasp an object, in the event that one of the fingers 10 is blocked as an example.

Two-Phalanx Fingers

Two-phalanx fingers are defined by a serial planar architecture with three successive links—namely the ground, proximal and distal phalanges—connected with revolute joints. This architecture has two DOF. Therefore, the number synthesis of the two-DOF closed-loop mechanism is performed assuming that only binary and ternary links are considered for the sake of simplicity:

$$\begin{cases} L = B + T \\ L - 5 = T \end{cases} \quad (1)$$

where L is the number of links of the architecture, B is the number of binary links, and T is the number of ternary links. Since the number of DOF is even, L must be odd. This set of equations has to be satisfied to obtain the compatible combinations of links with two DOF. However, this synthesis method might miss some particular architectures with peculiar geometric relationships (e.g., the Bennett linkage of Hobermann spheres) which are not considered herein. If $L=2k+1$ with $k \geq 2$, one obtains:

$$\begin{cases} T = 2(k-2) \\ B = 5 \end{cases} \text{ for } k \geq 2. \quad (2)$$

Figure 6:
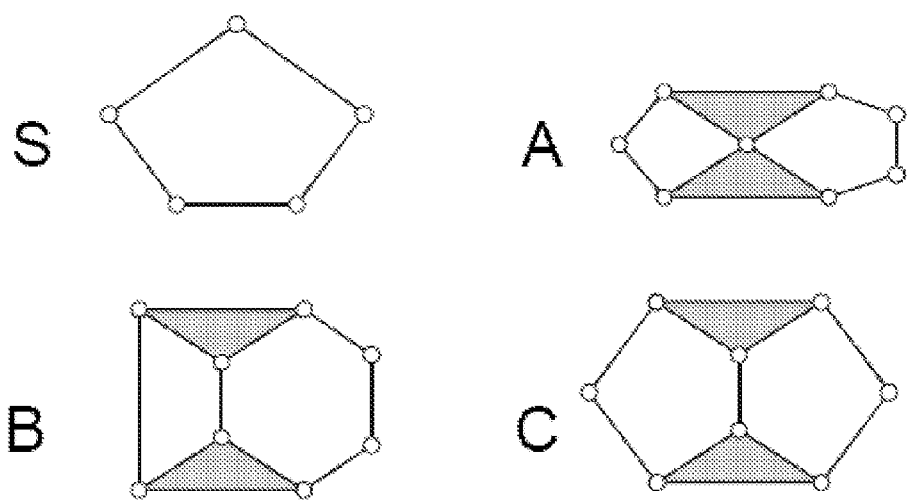
FIG. 6 is a schematic view of two-DOF closed-loop mechanisms with revolute joint, comprising seven or fewer links and defining four classes.

If the number of links is limited to a reasonable range, e.g., $L \leq 7$, and considering only revolute joints, one obtains the mechanisms illustrated in FIG. 6. The five-bar linkage (L=5) is the simplest two-DOF closed-loop mechanism and constitutes a special class S in FIG. 6. If L=7 (k=3), there are only three possible architectures—A, B, and C in FIG. 6—since there is only a finite number of possible connections between the ternary links while preserving the number of DOF.

Figure 7:
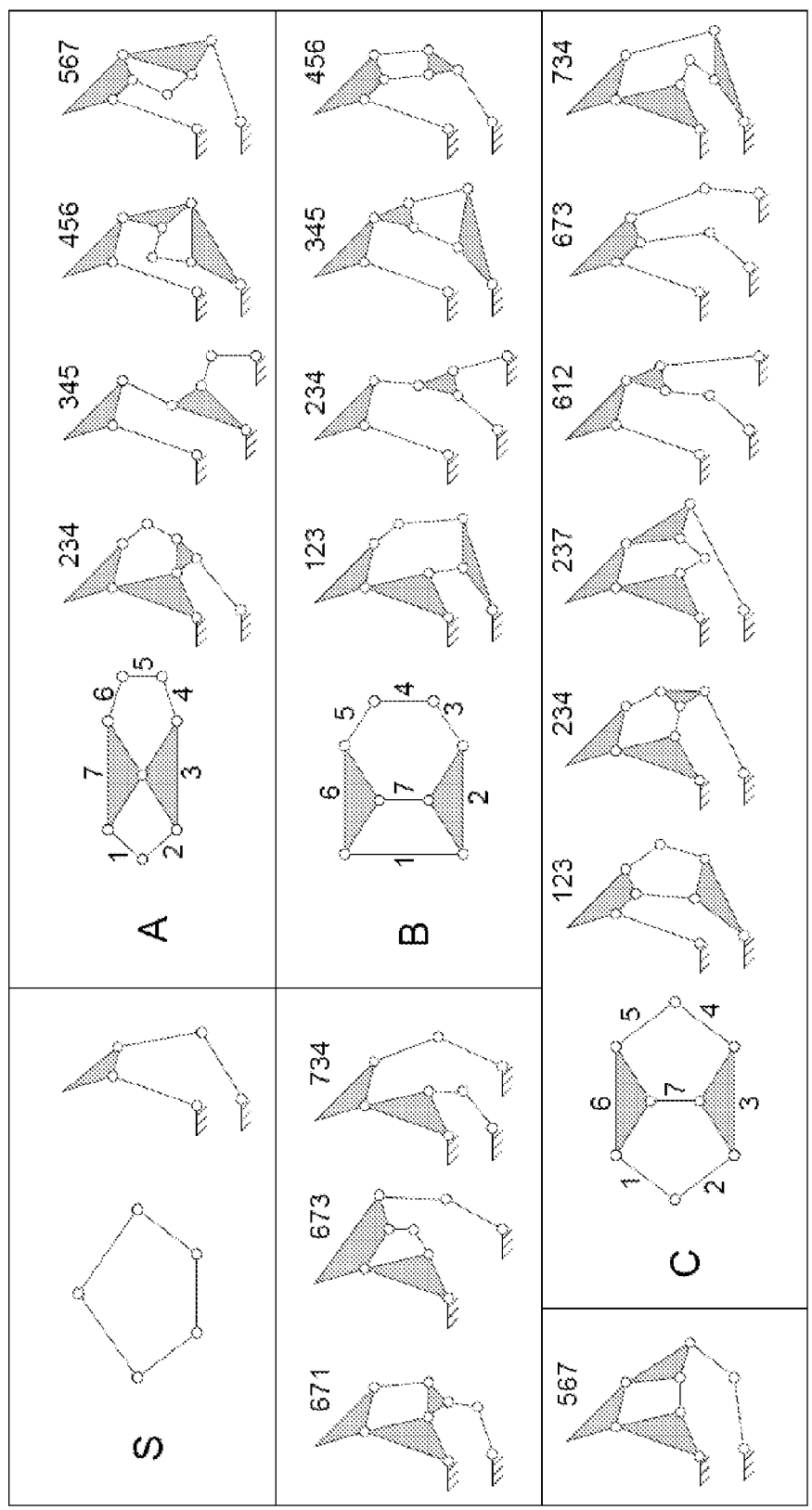
FIG. 7 is a table illustrating two-phalanx fingers with only revolute joints as obtained from the previous classes.

Each of these mechanisms can be used to design a two-phalanx robotic finger. The ground and proximal/distal phalanges must be chosen as three consecutive links of the previously obtained mechanisms, reflecting the serial architecture of robotic fingers. However, this choice is not entirely arbitrary, as it must satisfy the hypotheses enunciated above. For instance, the finger cannot be chosen as three links of the four-bar loops of mechanisms A or B (FIG. 6), for this choice would reduce the number of DOF of the finger to one. Removing symmetrical combinations, the architectures of linkage-driven robotic fingers illustrated in FIG. 7 are obtained. Each combination is designated by a number corresponding to the choice of which link is the ground, proximal and distal phalanges (in this order) with respect to the nomenclature indicated in the figure. Each possible combination of ground/proximal/distal links is tried with the four classes of mechanisms. The combinations not satisfying the above-mentioned hypotheses are eliminated, leaving 19 possible architectures of two-phalanx fingers with seven of fewer links connected with revolute joints.

It should be noted that any joint of the transmission linkage can be replaced with a prismatic joint of arbitrary axis or, more generally, any one-DOF joint (e.g., gears, cams, etc.) Considering that each joint can be either of the revolute or prismatic type and that there are three joints in the transmission linkage of the class S, this class actually comprises up to eight mechanisms, illustrated in FIG. 8. However, since geometric constraints are not taken into account, not all of these linkages are acceptable, and further investigations may be required. For instance, the last candidate of the class S illustrated in FIG. 8, comprising three prismatic joints in the transmission linkage, is invalid. The linkage itself still has two DOF, but the mobilities of the driven system are constrained by the transmission linkage. Similarly, with the architectures using two prismatic joints, the axes of the latter should not be parallel. Hence, when using more than one prismatic joint, the resulting mechanism should be carefully analyzed using dedicated tools such as screw theory. Similarly, each one of the architectures belonging to the A, B and C classes illustrated in FIG. 7 are the revolute-only members of a family comprising a maximal number of $2^6=64$ mechanisms if prismatic joints are considered. Therefore, the maximal possible number of architectures of two-phalanx fingers driven with linkages and revolute or prismatic joints is $1 \times 8 + 18 \times 64 = 1160$.

It should be emphasized that the aforementioned architectures are not referred to as self-adaptive or underactuated. Indeed, these designs can be fully actuated and are not necessarily self-adaptive. To obtain self-adaptive fingers, a number of actuators inferior to the number of DOF of the mechanism should be placed in coordination with passive elements. The issue is discussed hereinafter.

Three-Phalanx Fingers

Similarly to that described in the section entitled Two-Phalanx Fingers, a number synthesis is used to generate all the possible candidate architectures of linkage-driven fingers with three DOF. Assuming again that only binary and ternary links are considered, one has:

$$\begin{cases} L = B + T \\ L - 6 = T \end{cases} \quad (3)$$

Since the number of DOF is odd, L must be even. This set of equations has again to be satisfied to obtain the compatible combinations of links with three DOF. If $L=2k$, one obtains:

$$\begin{cases} T = 2(k-3) \\ B - 6 \end{cases} \text{ for } k \geq 3. \quad (4)$$

If the number of links is limited to a reasonable range, e.g., $L \leq 8$, and with only revolute joints, one obtains six mechanisms. One of the latter is the six-bar linkage (L=0, which is the simplest three-DOF closed-loop mechanism and constitutes a special class termed S. If L=8, there are only five possible architectures, designated by letters from A to E in FIG. 9.

Each one of these six mechanisms can be used to design a three-phalanx self-adaptive finger. The ground and proximal/intermediate/distal phalanges must be chosen as four consecutive links of the previously obtained mechanisms. Again, this choice must satisfy the hypotheses enunciated above. For instance, the finger cannot be chosen as four links of a four- or five-bar loop of mechanisms A, B, C or D, for this choice would reduce the number of DOF of the finger to one or two. Similarly, any subchain of the finger cannot be chosen as three links of a four-bar linkage for the same reason. Removing symmetrical combinations, one obtains the fingers illustrated in FIG. 9. Each combination is designated with a number corresponding to the choice of which links are the ground, proximal, intermediate and distal phalanges (in this order) with respect to the nomenclature indicated in the figure. Therefore, there are 30 architectures of three-DOF robotic fingers satisfying the above-mentioned hypotheses with eight or fewer links and revolute joints. If prismatic joints in the transmission linkage are considered, this number grows to a maximal number of $1\times2^3+29\times2^6=1864$ possible architectures.

Classification and Selection

Linkage-driven self-adaptive fingers found in the literature can be classified according to the nomenclature proposed in this paper, as illustrated in FIG. 10. In FIG. 10, S refers to the two-phalanx special class proposed in FIG. 7. The proposed nomenclature is established as follows: each architecture is identified to the class of closed-loop mechanism by the associated letter (A to E) followed by a sequence of three (with two phalanges) or four (with three phalanges) digits identifying the choice of links corresponding to the ground/phalanges arrangement. Therefore, with the exception of the trivial S class, no two- or three-phalanx architecture shares the same designation.

Evidently, not all the architectures obtained with the synthesis method appear equally interesting. However, there is probably not a universal optimal architecture to design self-adaptive fingers. Multistage architectures such as A4567 or B4567 usually have good performances with respect to the generated contact forces and size of the workspace. However, S-class fingers are by far the simplest architectures and therefore the least expensive to manufacture. Furthermore, each architecture can obviously be optimized with respect to one or several criteria, and it is very difficult to predict which architecture will yield the "best optimum." Therefore, the designer might reduce the pool of candidates by inspection, optimize each of the considered architectures to obtain practical designs, and finally select the best design. However, this approach is not recommended, since the elimination of candidate architectures might result in a poor selection if done by an unskilled designer. It is also important to note that, for each architecture, one has to select the locations of the actuator(s) and passive elements, and this choice will impact the performances of the design.

Figure 9:
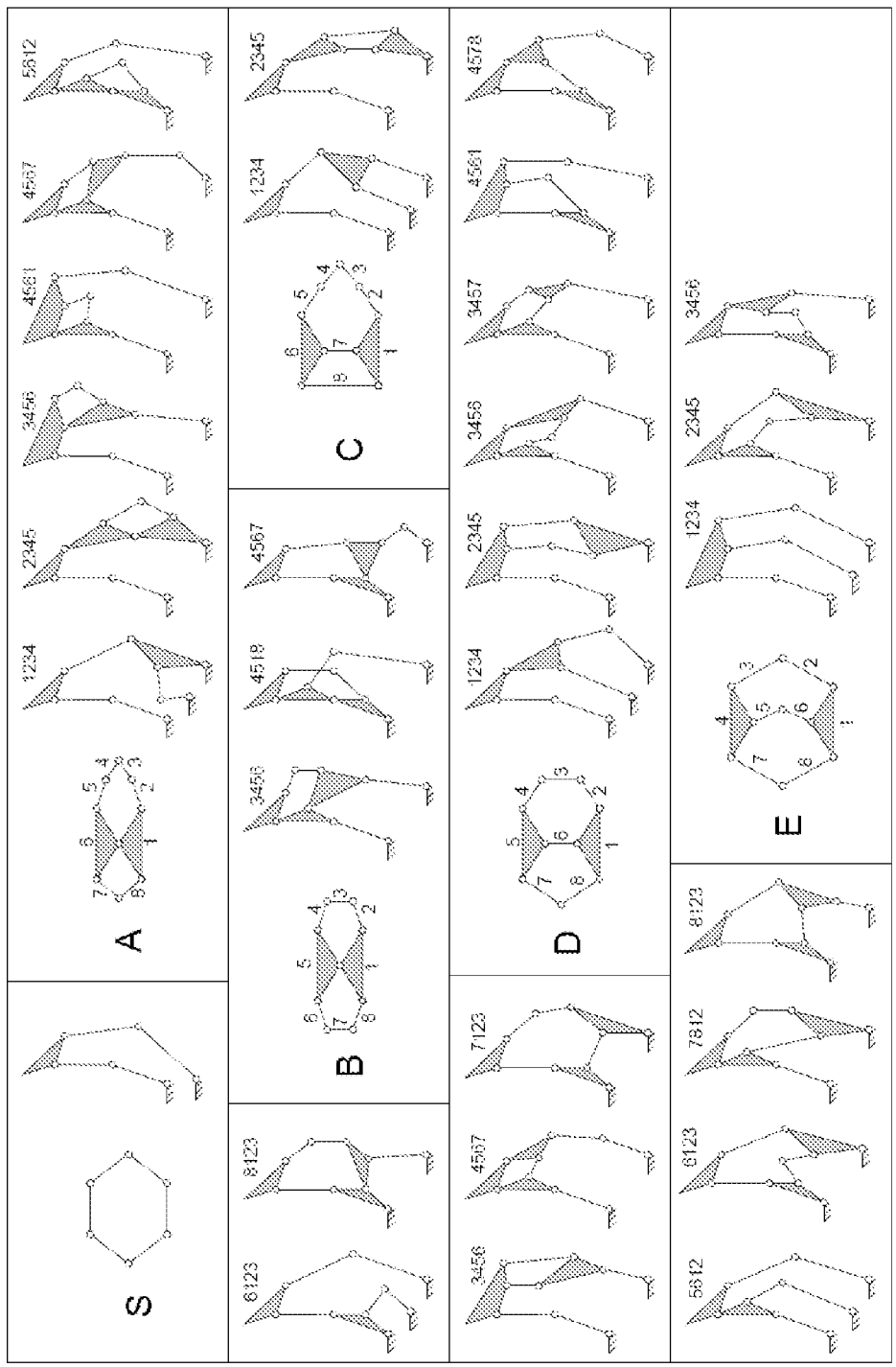
FIG. 9 is a table illustrating three-phalanx fingers with only revolute joints, comprising nine or fewer links.
Figure 29:
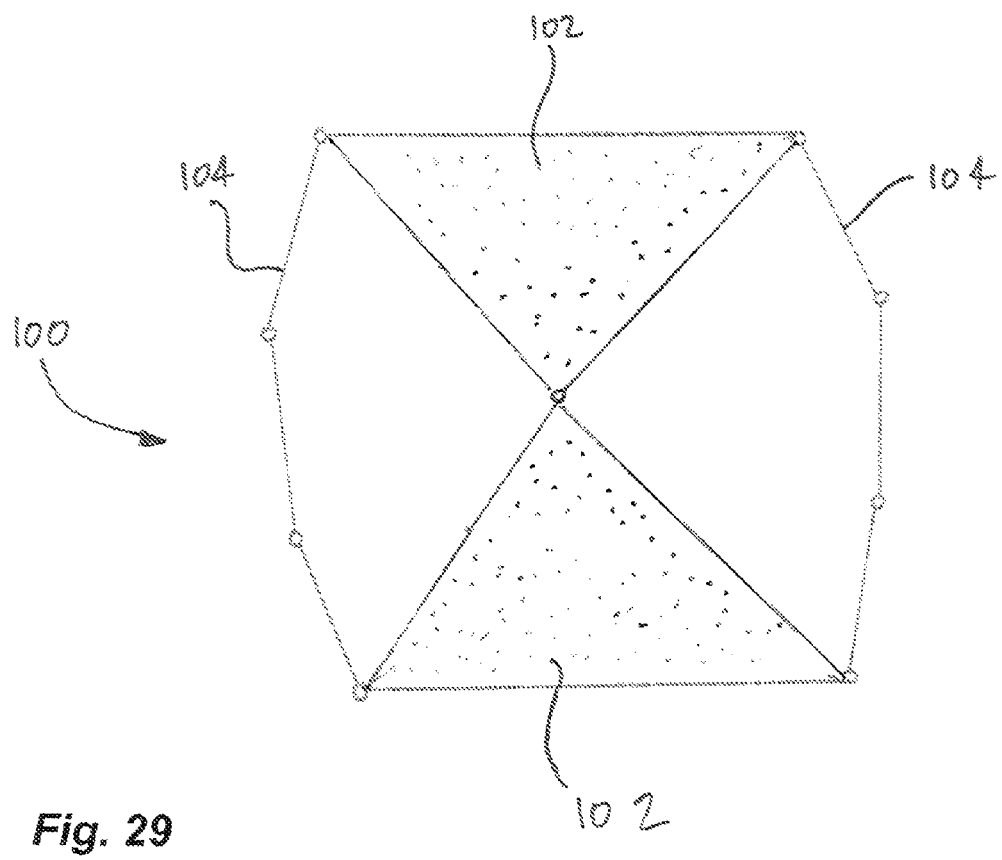
FIG. 29 is a schematic view of a self-adaptive mechanical finger in accordance with a second class (B) of mechanical fingers in accordance with the present disclosure.

Referring to FIG. 29, there is illustrated an architecture 100 for a mechanical finger of the B class (FIG. 9). The architecture 100 has two ternary links 102. The ternary links 102 are pivotally interconnected to one another. Moreover, the ternary links 102 are interconnected by two link sequences 104 of at least three binary links. As shown in FIG. 9, any one of the binary links forms the base of the mechanical finger of the B class. Various arrangements of the architecture 100 may be used to form fingers, as illustrated again in FIG. 9. For instance, one of the ternary links 102 is used as part of either one of the base and intermediate phalanx, while the other of the ternary links 102 may be the other of the base and intermediate phalanx. In another embodiment, all active joints are revolute joints, with all rotational axis of the revolute joints being parallel. It is observed that some links may feature inactive joints, which are not described herein for simplicity purposes.

Figure 30:
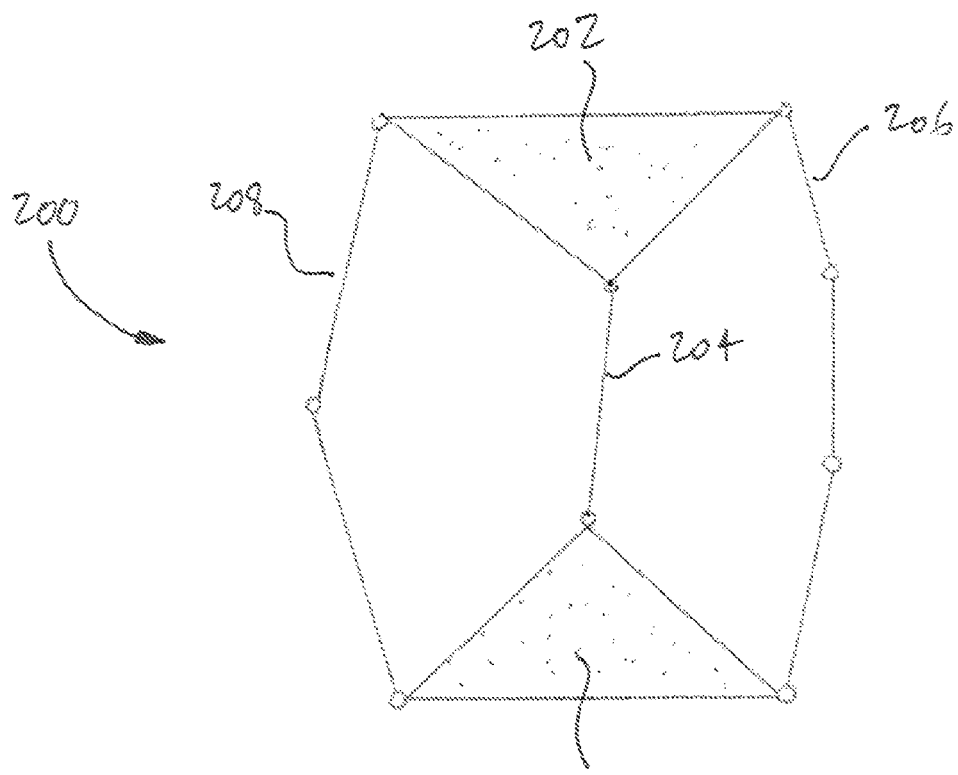
FIG. 30 is a schematic view of a self-adaptive mechanical finger in accordance with a third class (D) of mechanical fingers in accordance with the present disclosure.

Referring to FIG. 30, there is illustrated an architecture 200 for a mechanical finger of the D class (FIG. 9). The architecture has two ternary links 202. An isolated link 204 has its ends pivotally connected to the ternary links 202. A first link sequence 206 has at least three binary links actively interconnected to one another. The ends of the first link sequence 206 are pivotally connected to the ternary links 202. A second link sequence 208 has at least two binary links actively interconnected to one another. The ends of the second link sequence 208 are pivotally connected to the ternary links 202. As shown in FIG. 9, the ternary links 202, the isolated link 204, and the link sequences 206 and 208 are arranged such that a sequence of a base phalanx, an intermediate phalanx and an end phalanx comprises different combinations of binary links and ternary links.

Actuation

With each of the architectures obtained using the technique proposed in the previous sections, actuation and passive elements are required. Proper selection and location of both of them have to be dealt with carefully. Indeed, considering the architectures obtained in FIGS. 7 and 9, one cannot arbitrarily select a joint in the finger to be actuated. This choice must be made in order for the actuation torque to be distributed to all the joints of the driven system (i.e., the joints between the phalanges). The actuation torque (or force in the case of a prismatic joint) distribution is a fundamental characteristic of self-adaptive fingers and an attractive design option if it avoids the burden of embedding several actuators in the finger. Several architectures proposed above might be actuated through a joint between the transmission linkage and the ground, but not all of them. The joint selected for actuation must satisfy the distribution condition, namely:

$$\forall\, i \in [1, n],\ \exists\, \theta \left| \frac{\partial \tau_i(\theta)}{\partial T_a} \neq 0 \right. \tag{5}$$

where $\theta=[\theta_1 \ldots \theta_n]^T$ with respectively n=2 and n=3 for two- and three-phalanx fingers is the vector of the configuration states of the finger, i.e., the joint angles between the phalanges. Similarly, $\tau=[\tau_1 \ldots \tau_n]^T$ is the vector of the torques generated by the transmission linkage about these joints (cf. FIG. 11). Finally, $T_a$ is actuation torque. This distribution condition, despite its critical importance, usually does not clearly appear in the literature.

The relationship between the input and output torques can be established using either a static analysis or a virtual power approach. The distribution condition defined above physically means that, for each joint of the driven finger there exists at least one configuration where the actuation torque is distributed to this joint. In other words, the joint torques of the driven finger must not be independent of the actuation torque. It should be noted that local particular configurations failing this examination might exist, i.e., there often exists at least one joint i such as $\partial \tau_i/\partial T_a=0$ for a specific value of $\theta$. These local singular configurations should be avoided by design or located outside the workspace of the finger. Indeed, to ensure a closing motion of the phalanges, one must ensure that:

$$\forall\, i \in [1, n],\ \exists\, \theta \left| \frac{\partial \tau_i(\theta)}{\partial T_a} > 0 \right. \tag{6}$$

within the range of $\theta$ corresponding to the workspace of the finger. It should be noted that $\tau_i$ with $i=1, \ldots, n$, namely the joint torques of the driven finger, cannot be chosen for actuation because, if the corresponding joint is locked by one or several external contacts, no torque distribution would occur.

Figure 12:
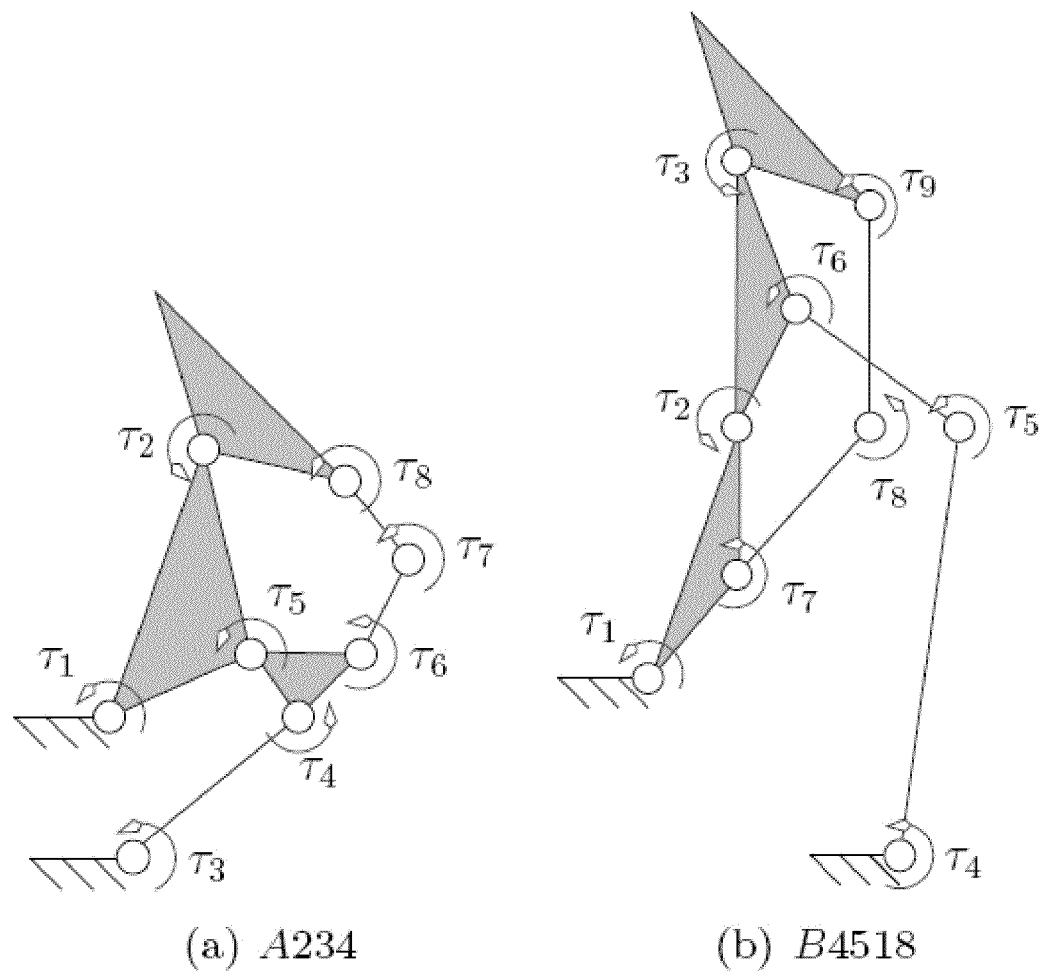
FIG. 12 is a schematic view of actuation selection for architectures A234 and B4518.

To illustrate how the distribution condition can be used in locating the actuator of a self-adaptive finger, let us consider the architecture A234. With a simple static analysis, one obtains:

$$\begin{bmatrix} 0 \\ 0 \end{bmatrix} = \begin{bmatrix} 1 & 0 & A & B & C & D & E & F \\ 0 & 1 & 0 & 0 & 0 & G & H & I \end{bmatrix} \begin{bmatrix} \tau_1 \\ \tau_2 \\ \tau_3 \\ \tau_4 \\ \tau_5 \\ \tau_6 \\ \tau_7 \\ \tau_8 \end{bmatrix} \quad (7)$$

or:

$$0 = S_{A234}(\theta)\tau^* \quad (8)$$

where $\tau^* = [\tau^T \tau_{n+1} \ldots \tau_{n+m}]^T$ are the torques in the n joints of the driven finger and the m joints of the transmission linkage, as illustrated in FIG. 12(a) with n=2 and m=6. The joints n+1 to n+m are the candidates for actuation. The matrix $S_{A234}$ is the Selection matrix of architecture A234 which allows choosing which joint may be actuated. The coefficients A through I are complex functions of the geometry of the mechanism and the angles $\theta_1$ and $\theta_2$. Despite their complexity, these coefficients can be obtained relatively effortlessly using a software package. According to equation (7), the only valid choices of actuation locations with respect to the distribution condition are $\tau_6$, $\tau_7$ or $\tau_8$. Indeed, as can be seen from the latter equation, the torques in the driven finger can be written:

$$-\tau_1 = A\tau_3 + B\tau_4 + C\tau_5 + D\tau_6 + E\tau_7 + F\tau_8$$

$$-\tau_2 = G\tau_6 + H\tau_7 + I\tau_8 \quad (9)$$

Hence, $\tau_2$ is independent of $\tau_3$, $\tau_4$ and $\tau_5$ and, if actuation is located in these locations, it will fail to satisfy the distribution condition. Usually with simple linkages like two-phalanx fingers, a skilled designer can readily identify unacceptable locations simply by inspection. However, if either more complicated driven systems are considered or a large number of links is used, the method presented in this section becomes mandatory. The relationship between the torques in joints of the driven finger and the transmission linkage can be described for any above-described architecture. For instance, with the architecture termed "Xijk" one would obtain:

$$0 = S_{Xijk}(\theta)\tau^* \quad (10)$$

Not every architecture obtained using the methodology presented above can pass the distribution condition. For instance, if one considers architecture B4518 illustrated in FIG. 12, one has:

$$0 = \begin{bmatrix} 1 & 0 & 0 & A & B & C & 0 & 0 & 0 \\ 0 & 1 & 0 & D & E & F & G & H & I \\ 0 & 0 & 1 & 0 & 0 & 0 & J & K & L \end{bmatrix} \tau^* \quad (11)$$

Hence, no single joint of the transmission linkage can distribute its torque to all the joints of the finger. Therefore, to drive this architecture, at least two actuators are required. Requiring more than one actuator to ensure proper torque distribution is also fairly common if one considers quaternary (or pentagonal, etc.) links in the synthesis procedure while keeping a limited number of total links. The resulting mechanisms tend to have separate kinematic loops (e.g., FIG. 13) preventing proper distribution of the actuation.

Passive Elements

To drive a n-DOF system driven by a single actuator, n−1 supplementary DOF have to be constrained to obtain a statically determined system. Hence, a minimal number of n−1 passive elements are required. These elements have been referred to as "passive actuators" and, although this is a contradiction of terms, it is a fairly adequate description of their function. Since the objective is to apply an external constraint on the system, numerous elements can be used. The most common of these elements used in self-adaptive hands are illustrated in FIG. 14 and can be categorized into two families, namely triggered and continuous elements.

Figure 5:
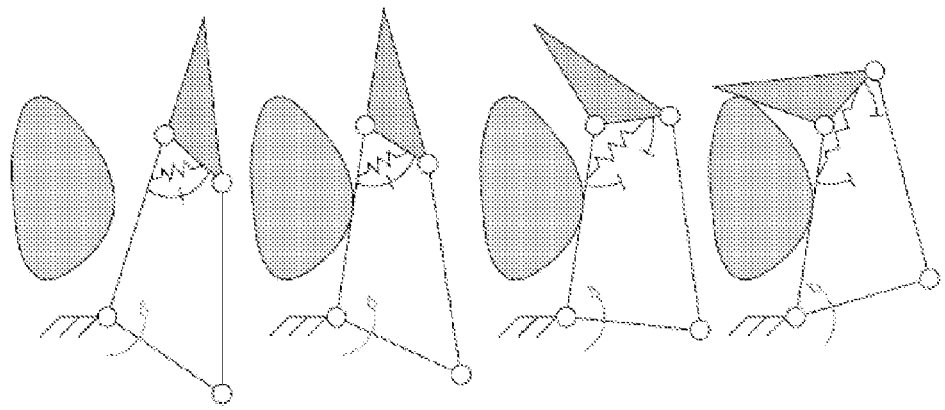
FIG. 5 is a schematic view of a closing sequence of a two-DOF self-adaptive finger in accordance with the prior art.

Triggered elements allow motion in the joint only after a certain force or torque arises in the latter. The most common solutions to achieving this behavior are the preloaded spring and the friction clutch. Continuous elements are also possible despite being far less popular. These elements exhibit a continuous motion of the associated joint with respect to the force or torque applied. Examples of continuous elements are the damper (a non-preloaded spring is also possible), and a mass or inertial element as illustrated in FIG. 13. It should be noted that passive, and especially continuous, elements can be combined (e.g., a spring in parallel with a damper). Triggered elements are used to temporarily decrease the number of DOF of the finger to match the number of actuators. Furthermore, they can be used to constrain the shape of the finger during the pregrasping phase if correctly located and preloaded. On the other hand, continuous elements have a similar effect on the finger as actuators, and their effect must be distributed to the joints of the driven finger as discussed above. The location of passive elements can be determined using a procedure similar to the one described in the previous section, as will be detailed. However, in this case, placing a passive element in one of the joints of the finger is an acceptable choice. Actually, from a historical perspective, passive elements, continuous or not, have been consistently located in these joints in order to maintain the finger phalanges aligned during the pregrasping phase, as illustrated in FIG. 5. If more than one passive element is required, it should be noted that only their combined effect has to apply to the driven joints, not each element separately. This is the fundamental difference to be considered in the selection of an acceptable location between actuation and passive elements.

The locations of the passive elements in the joints of an architecture obtained using the method presented above must be chosen in order for the self-adaptive finger to be statically determined. This condition on the static equilibrium of the system is related to the Transmission matrix presented in Birglen et al., as will now be presented. The contact forces generated by the finger are related to the torques of the actuator and passive elements. Indeed, $\tau$ can be expressed as:

$$\tau = J^T f \quad (12)$$

where f is the vector of the generated contact forces (one for each phalanx) and assumed normal to the surface of the phalanx. The matrix J is the Jacobian matrix of the grasp as proposed in Birglen et al. This matrix should not be confused with the Grip Transform matrix, as described in Mason, M. T., and Salisbury, J. K., "*Robot Hands and the Mechanics of Manipulation,*" MIT Press, 1985, usually noted G and commonly found in the literature about grasping. The generated contact forces are related to the actuation and passive element torques by:

$$f = J^{-T} T^T t \quad (13)$$

where vector t contains the actuated and passive element torques, i.e., $t = [T_a T_2 \ldots T_n]^T$ with n=2 or 3, respectively, with two- and three-phalanx fingers. The torques $T_i$ are due to the passive elements, e.g., $T_i = K_i \Delta \alpha_i$ if a simple rotational spring is considered ($K_i$ and $\alpha_i$ are respectively the stiffness and deflection angle associated with this spring). The above equation is valid with any location of the passive elements since the matrix T has to be built consistently with the choice of these locations. This matrix T is the second form of the Transmission matrix proposed in Birglen, L., "*Analysis and Control of Underactuated Robotic Hands*," Ph. D. thesis, Faculté des sciences et de genie, Université Laval, Canada, 2004, and characterizes the transmission linkage. It relates the velocities of the actuated and passive element joints to the velocities of the driven joints of the finger, namely:

$$\omega = T\dot{\theta} \tag{14}$$

with $\dot{\theta} = [(\dot{\theta}_a \dot{\theta}_{p1} \ldots \dot{\theta}_{pn-1}]^T$ where $\theta_a$ is the angle of the actuated joint (selected using the procedure described in the Actuation section) and $\theta_{pi}$ are the angles of the selected joints corresponding to the passive elements. Considering equations (12) and (13), one readily obtains:

$$\tau = T^T t. \tag{15}$$

By comparing equations (10) and (15), it clearly appears that the Transmission and the Selection matrices are closely related. Indeed, the lines of the Transmission matrix are a subset of the columns of the Selection matrix corresponding the joints actuated and with passive elements (with a difference of sign). Indeed, equation (15) can be written:

$$0 = \begin{bmatrix} 1_n & -T^T \end{bmatrix} \begin{bmatrix} \tau \\ t \end{bmatrix} \tag{16}$$

where $1_n$ is the n×n identity matrix. By definition of vector t, the first line of the Transmission matrix corresponds to the actuated joint and the subsequent lines to the passive elements.

According to equation (15), the relationship between the torques in the driven joints and in the actuated/passive joints is linear. Considering this linear relationship, to obtain a statically determined mechanism, one must choose the location of the passive elements such that:

$$ker(T) = 0 \text{ or } det(T) \neq 0. \tag{17}$$

Therefore, the second step in the synthesis procedure as proposed herein, after the mechanical architecture of the finger has been chosen, is to construct a Transmission matrix T from the Selection matrix such as:

1. no element on its first line is always zero (distribution condition of the actuation;
2. the matrix (generally) has full rank.

Usually, several choices of location for the passive elements satisfy the latter condition. Certain locations such as the joints between the phalanges are typically preferred by the designer, as they lead to specific pregrasping kinematic behavior of the finger, as will be discussed in the next section.

EXAMPLES

Comparison of Two-Phalanx Architectures

Figure 16:
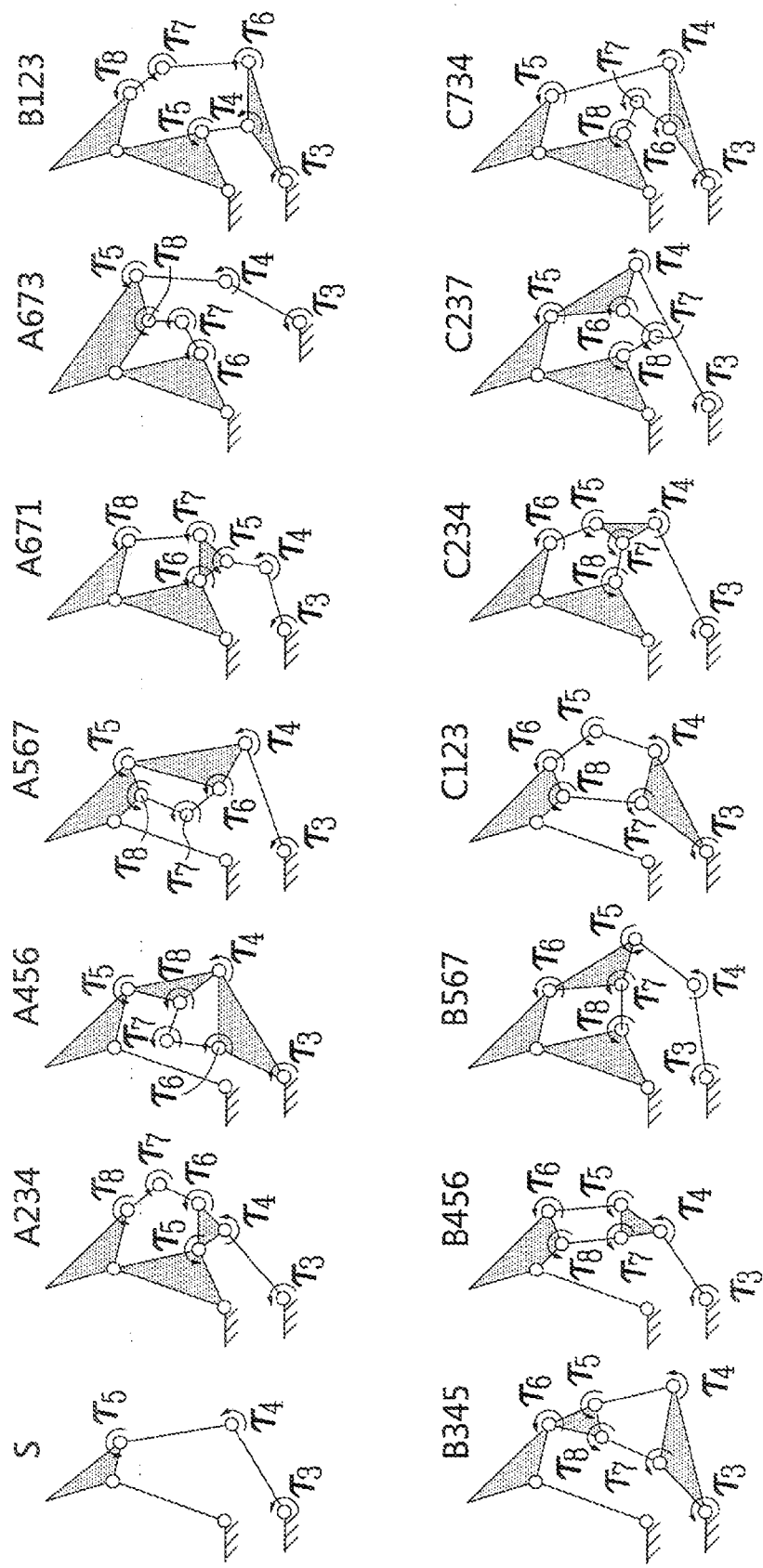
FIG. 16 is a schematic view of torque nomenclature of candidate two-phalanx fingers.

The tools presented herein can be used to compare the different architectures of two-phalanx fingers obtained above. As an example, it is supposed that one wants to select an architecture among the latter to design a self-adaptive finger. It is assumed that only revolute joints are acceptable, and that the designer desires a transmission linkage with only one attachment to the ground. Due to the latter hypothesis, the architectures A345, A734, B234, C612 and C673 are eliminated, leaving 14 valid choices. With the geometric parameters presented in FIG. 14, where the torque nomenclature in the transmission linkage is detailed, the expressions of the corresponding Selection matrices are presented in FIG. 15. Again, due to the complexity of the symbolic expressions of these matrices, only numerical results (rounded to one digit) are presented with the geometric parameters and configurations corresponding to FIG. 16.

To evaluate the remaining architectures, it is assumed that the finger must be actuated through the link attached to the ground. Hence, the first line of the Transmission matrix corresponds to the third (by convention) column of the Selection matrix. From this constraint, the architectures A234 and B123 are eliminated, since one element of the third column of their associated Selection matrix is zero. It can be verified that this is true for any geometric configuration of the finger. Therefore, the distribution condition is not satisfied for these architectures and locations of actuation. Interestingly, the first element on the second line of matrix $S_{B345}$ is also zero (actually, it is very small—approximately 0.02—but not exactly zero), which similarly eliminates this architecture. It can be verified, however, by using another geometric configuration that this situation is only local with architecture B345. Now, one needs a performance index to compare the fingers. In this example, the uniformity of the torques in the driven joints is chosen. The associated index can be defined as:

$$I = \frac{\tau_1}{\tau_2} \delta(\tau) \tag{18}$$

where 1 is the ideal case and $\delta(\tau)$ is a Kronecker-like symbol for the positiveness of vector $\tau$ that allows situations to be discarded where both torques are negative (although this situation is not critical if actuation is reversible):

$$\delta(\tau) = \begin{cases} 1 & \text{if } \tau_i > 0_1 \forall i \\ 0 & \text{otherwise} \end{cases} \tag{19}$$

Figures 17, 18:
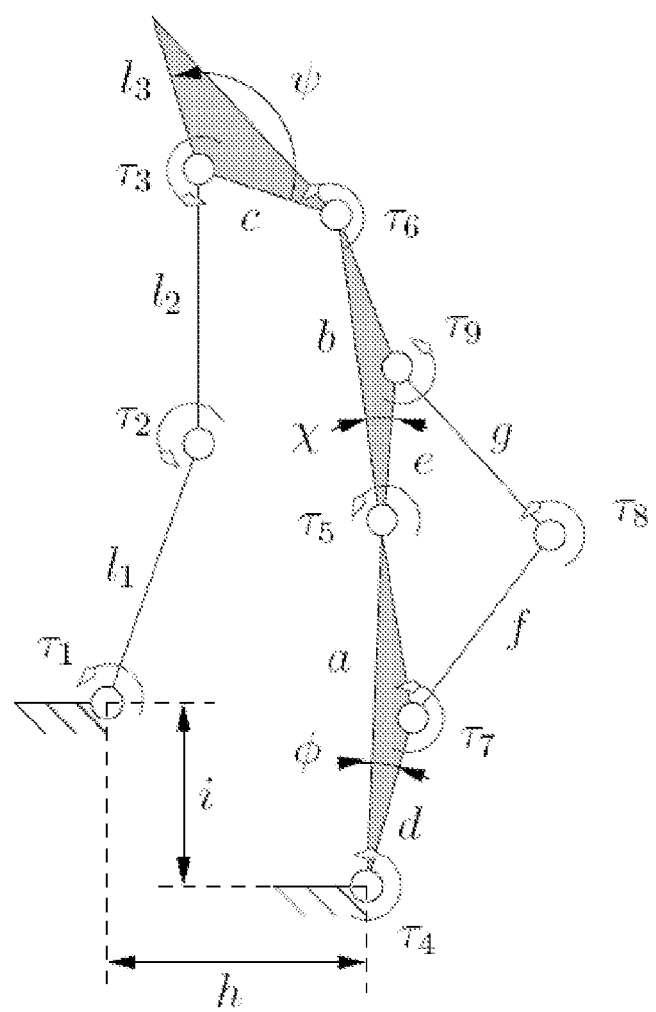
FIG. 17 is a table illustrating a performance index I for considered architectures.
FIG. 18 is a schematic view illustrating the parameters of architecture A2345.

If the spring torque is small and considered negligible with respect to the actuation torque, this index can be very simply expressed for each architecture as the ratio between the elements of the third column of its Selection matrix. The numerical values of the performance index for each architecture considered are presented in FIG. 17.

From these results, it can be seen that the best architecture is A673 and, considering its Selection matrix, the required spring can be placed in any of the other joints of the finger. Taking into account the performance index previously defined in equation (18), this element has the least impact on the performance index when located in the joint corresponding to $\tau_6$.

As seen in this example, the Selection matrix can be used to select to compare architectures of self-adaptive fingers, and also to select a location for passive elements. Although it should be said that this example is only presented for illustration purposes and to be fair, the geometric parameters of each architecture should have been optimised with respect to the performance index before comparing them.

Selection of Actuation Location

The methodology described herein can also be used to choose optimal location for actuation with a particular design of self-adaptive finger. As an example, let us consider the architecture A2345 illustrated in FIG. 18. Obtained using a simple static analysis, the Selection matrix of this architecture is:

$$S_{A2345} = \begin{bmatrix} u_1 & u_2 & u_3 & v_1 & v_2 & v_3 & v_4 & v_5 & v_6 \end{bmatrix} \quad (20)$$
$$= \begin{bmatrix} 1 & 0 & 0 & A & B & C & D & E & F \\ 0 & 1 & 0 & G & H & I & J & K & L \\ 0 & 0 & 1 & M & N & O & P & Q & R \end{bmatrix}$$

From equation (20), it appears that any of the six joints in the transmission linkage can be selected for actuation (cf. Actuation section). However, to select the locations of the two required passive elements, attention should be paid to the rank of the matrices created from combining columns of the Selection matrix. In particular, one should notice that the fifth and last three columns of $S_{A2345}$ are linearly dependent; namely, one has:

$$\text{rank}[v_2 v_4 v_5 v_6] = 1. \quad (21)$$

This linear dependency usually does not clearly appear if a software package is used to obtain the Selection matrix, but can nevertheless be verified numerically. The reduced rank of equation (21) is characteristic of a one-DOF closed loop in the transmission mechanism. For instance, if the values of the geometric parameters are chosen to correspond to FIG. 15, the numerical value of $S_{A2345}$ is:

$$\begin{bmatrix} 1 & 0 & 0 & -3.4 & 5.9 & -3.5 & 2.2 & 1.2 & 2.5 \\ 0 & 1 & 0 & -1.9 & 3.5 & -2.5 & 1.3 & 0.7 & 1.4 \\ 0 & 0 & 1 & -1.4 & 3.1 & -2.8 & 1.2 & 0.6 & 1.3 \end{bmatrix} \quad (22)$$

The deduced row echelon form of the matrix formed by the last six columns of the previous numerical example is:

$$\begin{bmatrix} 1 & 0 & 0 & 0 & 0 & 0 \\ 0 & 1 & 0 & 0.38 & 0.20 & 0.42 \\ 0 & 0 & 1 & 0 & 0 & 0 \end{bmatrix} \quad (23)$$

where it clearly appears that each pair of the columns corresponding to $V_2$, $V_4$, $V_5$ and $V_6$ is linear dependent, at least locally. Thus, only one of the corresponding joints can be used to place either actuation or a passive element. If two or more of these joints are used, the Transmission matrix will lose rank and become singular in all configurations.

Subsequently, one has to choose the locations of the passive elements. The latter can be located in any joint of the mechanism distinct from the one selected for actuation, providing that the resulting Transmission has generally full rank (cf. Passive Elements section). Assuming that these locations are chosen by a kinematic constraint, e.g., it is desired that during the pregrasping phase all the phalanges stay aligned in order to increase the reachability of the finger.

From this kinematic constraint, both passive elements are required to be springs located between the phalanges (proximal-intermediate and intermediate-distal joints). It can be demonstrated from equation (20) that these locations allow for a full-rank Transmission matrix for any location of the actuated joint. Finally, deciding the location of the actuator in one of the six possible locations is not a trivial task; each location is a valid choice. Indices may be used to evaluate the performance of each possible choice. For instance a measure can be obtained on how far one is to losing contact with one phalanx by including a "distance" from the vanishing of the smallest component of the contact forces as proposed in Birglen et al. This index is noted η and, using the geometric parameters listed in FIG. 2, its value is computed over a workspace defined by $\pi/4 < \theta_1 < 3\pi/4$ and $0 < \theta_i < \pi/2$ for i=2, 3. This set of geometric parameters has been rapidly chosen to allow the finger to reach the entire workspace. The results are presented in FIG. 20 (the contacts are assumed at mid-phalanx).

Hence, for this geometry of the finger, the optimal location of the actuator by far is in $\tau_4$. It is intriguing that this location also permits attaching the actuator to the ground and, therefore, might have been the preferred choice from a practical design point of view. However, this result does not necessarily hold with a different set of geometric parameters and/or with other architectures of fingers.

The actual number of possible architectures is 19, belonging to a much larger family of up to 1,160 members. Extending the method, the synthesis of three-phalanx fingers is also addressed herein, and the number of possible architectures of these fingers, even with a limited number of links, is shown to be as large as 1,864. Consequently, a method of properly selecting actuated joint(s) and the locations of the passive elements of the architectures, a required step for achieving the self-adaptation property, is presented.

Figure 21:
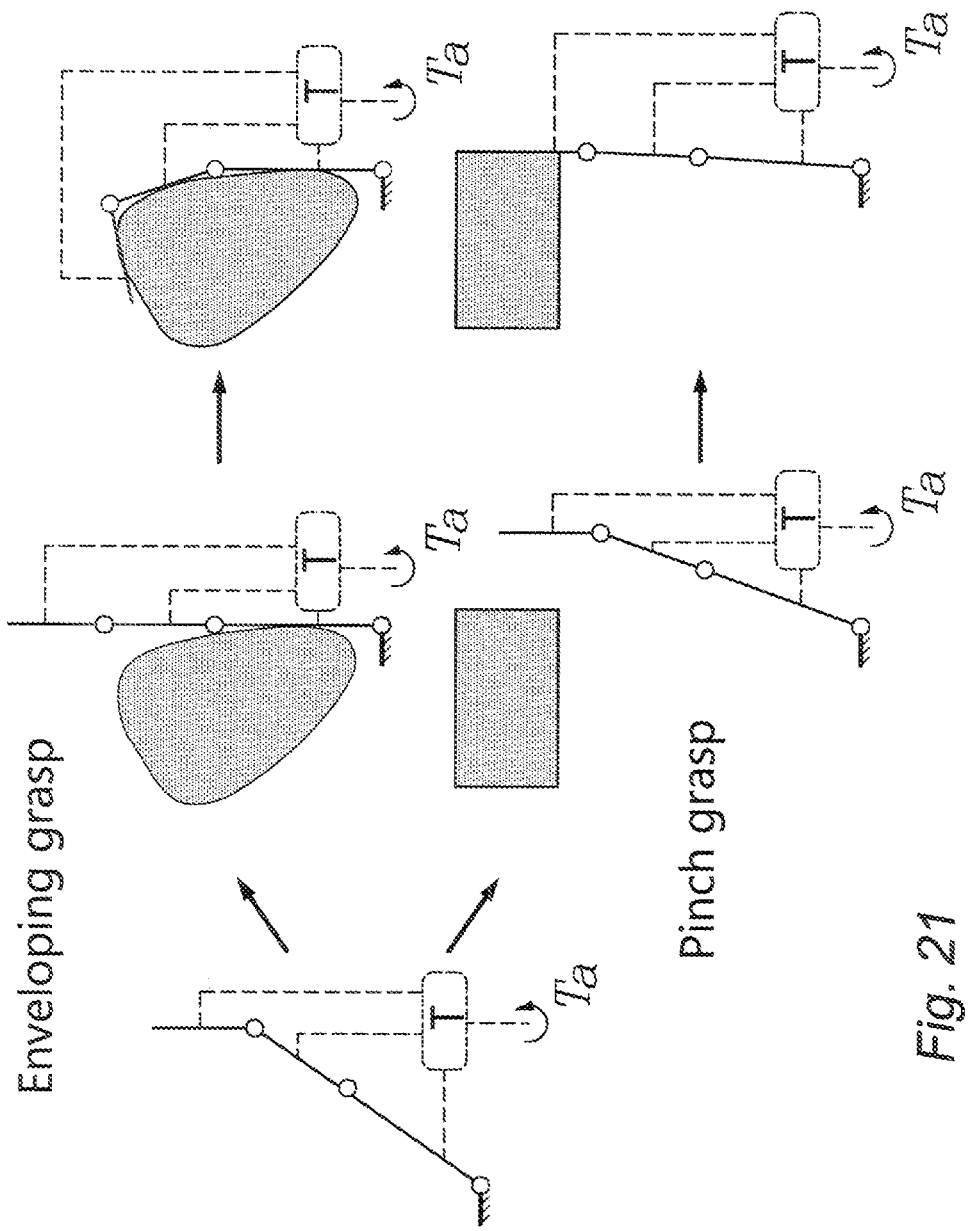
FIG. 21 is a schematic view illustrating two possible closing sequences of a three-phalanx finger designed for pinch grasping.
Figure 22:
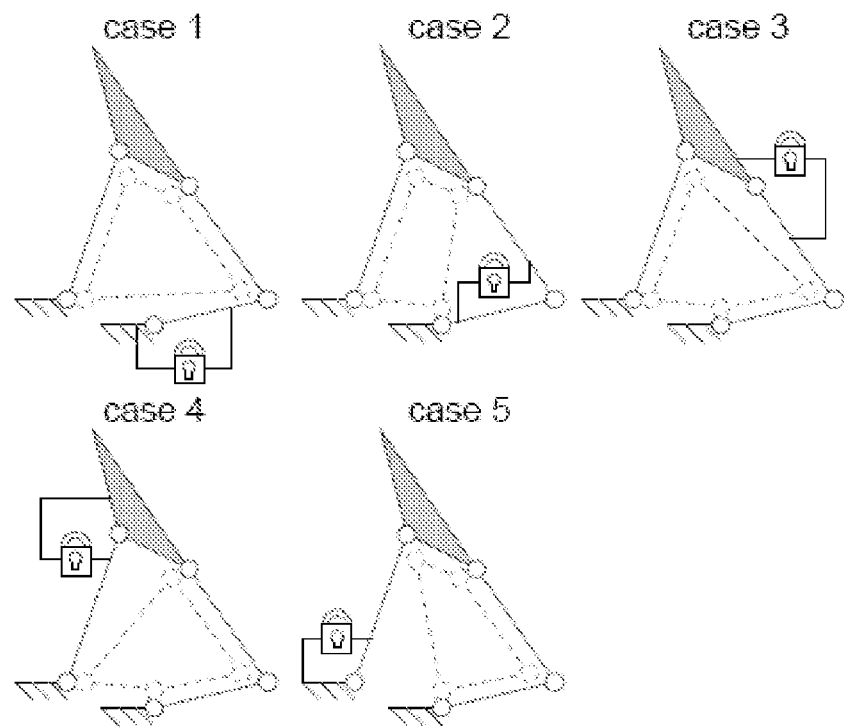
FIG. 22 is schematic views of kinematic reductions of two-phalanx class S fingers with one triggered element.

Referring to FIGS. 21 to 25, an interesting feature of self-adaptive robotic fingers is the ability to maintain their distal phalanx perpendicular to the palm during their closing sequence. This kinematic property allows pinch grasps as illustrated in FIG. 21. This is very useful when the finger is seizing objects with linear edges. It should be noted that the shape adaptation capability must be kept to perform enveloping grasps if required (upper part of FIG. 21). The preshaping equation characteristic of a finger capable of pinch grasps is:

$$\sum_{i=1}^{n} \theta_i = \frac{\pi}{2} \quad (24)$$

Note that, in this case, this preshaping can be described by single equation.

To achieve this feature, prototypes have been developed using various solutions such as a complex cam-linkage mechanism that can be disengaged, an additional "transmission" linkage or, more recently, a combination of two interconnected struts with non-reversible valves dubbed the "air parallelogram." These solutions have been reported to work well, but all require an addition to the transmission linkage used for self-adaptation. However, if one carefully uses triggered elements in certain joint(s) of the mechanism, this behavior can be closely approached without requiring any addition.

Figure 26:
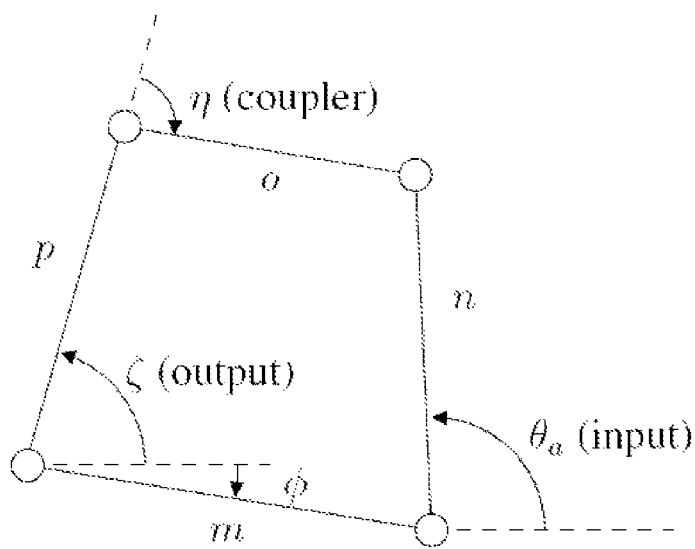
FIG. 26 is a schematic view of a model of a four-bar linkage in accordance with another embodiment.
Figure 27:
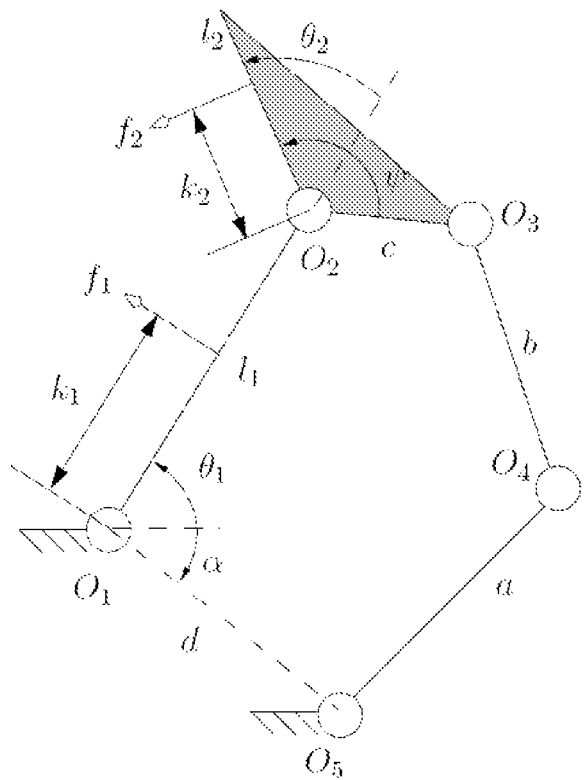
FIG. 27 is a schematic view showing details of a class S two-phalanx finger.

It is well known that a parallelogram linkage maintains its coupler link parallel to the ground. This property can be used in the design of self-adaptive robotic fingers with pinch preshaping. For instance, considering the mechanical architectures presented in FIG. 22, and with reference to FIGS. 26 to 28, non-trivial cases (1-3) can be kinematically reduced to a parallelogram if simple geometric conditions on the lengths of the links are satisfied. Namely, in case 1 they are:

$$b = l_1 \text{ and } r = c. \quad (25)$$

In case 2, they become:

$$c = d \text{ and } s = l_1. \quad (26)$$

Finally, in case 3, one has:

$$a=l_1 \text{ and } t=d. \quad (27)$$

If these conditions are satisfied, the equation describing the motion of the finger before it touches an object becomes:

$$\theta_1+\theta_2=\phi-\eta+\theta_2. \quad (28)$$

Figure 23:
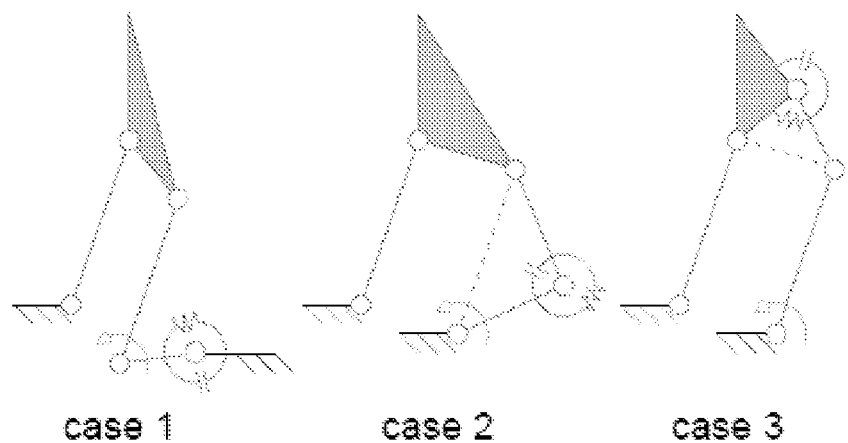
FIG. 23 is a schematic view of designs of two-phalanx class S fingers with pinch preshaping.

This equation is valid with any of the three cases considered and it is trivial to show that the right-hand side of the previous equation is constant, i.e., $\theta_2$ is canceled in all cases by $\eta$ and only the design parameters are left. Therefore, it is possible to choose these parameters to exactly match equation (24). Hence, for the distal phalanx of a two-phalanx class S finger to maintain a constant orientation with respect to the ground, one simply has to place a triggered element in one joint of the transmission linkage, adjust the lengths of the latter in order for the resulting one-DOF mechanism to be a parallelogram, and choose the remaining geometric parameters to ensure that equation (28) matches equation (24). The method is illustrated in FIG. 23; the circular arrows indicate actuation. With these designs, the distal phalanx will remain perpendicular to the palm until a contact occurs. When this contact is established, the actuation torque will overcome the preloading of the triggered element and initiate the closing of the other phalanx. Hence, pinch preshaping is achieved without any additional mechanisms.

Nevertheless, if the contact occurs with the distal phalanx during this pregrasping phase, the resulting grasp stability must be studies to determine if the linear contact can be maintained. Indeed, with a contact only one phalanx, i.e., one constraint, a two-DOF finger without additional mechanisms is not necessarily in static equilibrium. If this is not the case, contact with the whole line will be lost and a sliding motion of the finger in contact with only one vertex of the object will occur. The contact situation can lead to either a stable grasp or ejection. It should be noted that the parallelogram linkages proposed in FIG. 23 are known to achieve very poorly with respect to grasp stability. However, this is not an issue here because the parallelogram shape is only maintained during the preshaping phase and pinch grasps. It is automatically disengaged when a contact does not occur with the distal phalanx.

Figure 24:
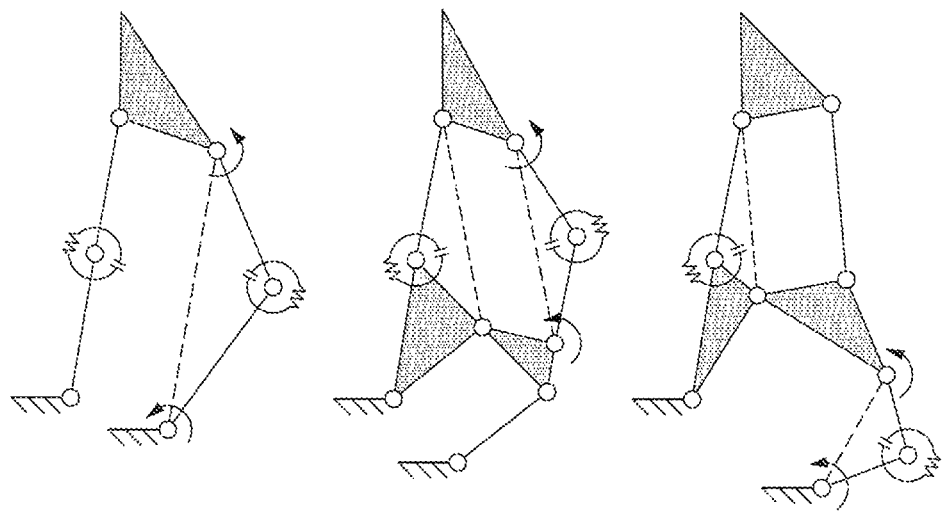
FIG. 24 is a schematic view of three-phalanx self-adaptive fingers with pinch preshaping.

Pinch preshaping can be adapted to a finger with three phalanges by taking into account the grasp stability and the expressions of the contact forces of three-phalanx fingers. In order to maintain the desired orientation of the distal phalanx, one can use cascaded parallelograms as illustrated in FIG. 24. In this figure, three architectures are illustrated where two triggered elements are used to maintain the orientation of the distal phalanx during the closing preshaping. The circular arrows indicate possible actuation location, but it should be noted that only one location has to be chosen, i.e., all fingers have three DOF but can be driven by a single actuator.

When designing prosthetic fingers, two approaches are well known. Either attention is paid to the closing motion of the prosthesis to mimic a human finger, i.e., an anthropomorphic preshaping, or to the forces generated by the phalanges. Since the latter approach does not require a particular closing motion, it has led to the introduction of self-adaptive fingers in prosthetics. However, it is possible to design an artificial finger that has an anthropomorphic closing motion while keeping the self-adaptation property.

Figure 25:
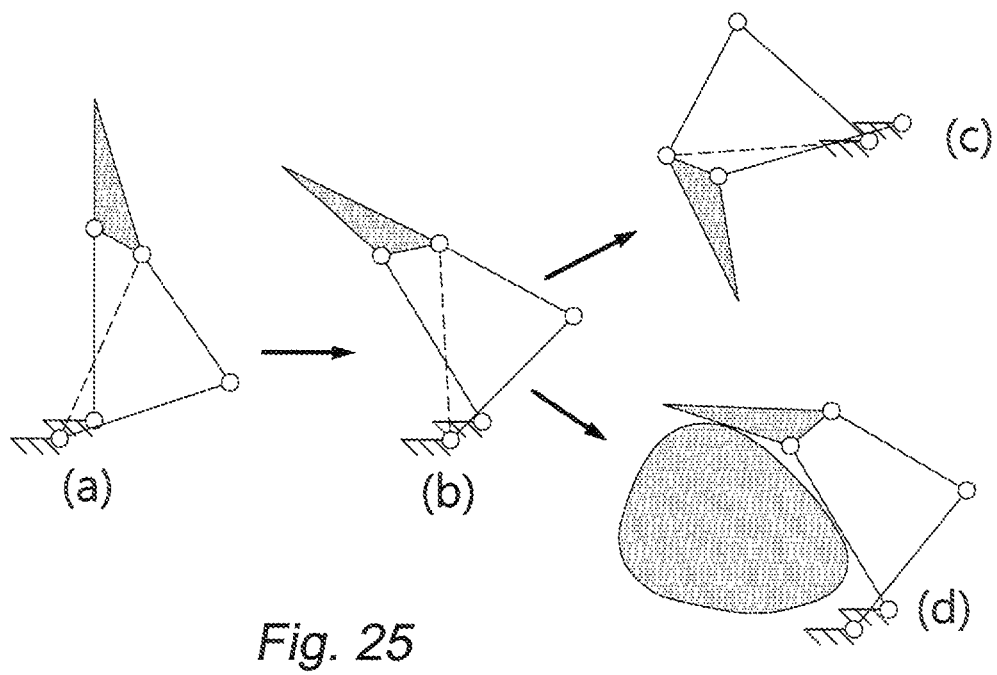
FIG. 25 is a schematic view illustrating closing motions of a two-phalanx class S finger.

Referring to FIG. 25, the two-phalanx finger mechanism of Case 2 of FIG. 23 is illustrated, showing possible closing motions. The finger mechanism of FIG. 25 with a triggered passing element in $O_4$ will have a preshaping close to a human finger while keeping the self-adaptation property.

The invention claimed is:

1. A mechanical finger comprising:
a first phalanx pivotally connected at a proximal end to a base;
at least a second phalanx pivotally connected at a proximal end to a distal end of the first phalanx;
a transmission linkage between the base and the second phalanx, the transmission linkage comprising at least:
a first link pivotally connected at a proximal end to the base,
a second link pivotally connected at a proximal end to a distal end of the first link and pivotally connected at a distal end to the second phalanx, said phalanges and said links pivoting about parallel pivot axes, and
a locking device for selectively blocking at least one joint in the transmission linkage; and
a parallelogram configuration formed between the base, the first phalanx, the second phalanx, and the transmission linkage when the locking device selectively blocks the at least one joint, for the second phalanx to move in a constant orientation relative to the base when the locking device selectively blocks the at least one joint, to maintain the parallelogram configuration as the second phalanx moves.

2. The mechanical finger according to claim 1, wherein the locking device is located at the joint between the base and the first link to selectively block the joint therebetween.

3. The mechanical finger according to claim 1, wherein the locking device is located at the joint between the first and the second link to selectively block the joint therebetween.

4. The mechanical finger according to claim 1, wherein the locking device is located at the joint between the second phalanx and the second link to selectively block the joint therebetween.

* * * * *